United States Patent
Takemura et al.

(10) Patent No.: US 6,842,107 B2
(45) Date of Patent: Jan. 11, 2005

(54) INFORMATION PROCESSING DEVICE AND INFORMATION PROCESSING METHOD

(75) Inventors: Hidenobu Takemura, Kanagawa (JP); Yasuyuki Nagata, Kanagawa (JP); Tetsuya Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/398,958

(22) PCT Filed: Aug. 6, 2002

(86) PCT No.: PCT/JP02/08038

§ 371 (c)(1),
(2), (4) Date: Aug. 11, 2003

(87) PCT Pub. No.: WO03/017578

PCT Pub. Date: Feb. 27, 2003

(65) Prior Publication Data

US 2004/0054783 A1 Mar. 18, 2004

(30) Foreign Application Priority Data

Aug. 14, 2001 (JP) ........................................ 2001-245993

(51) Int. Cl.[7] ................................................ G08B 9/00
(52) U.S. Cl. ............................ 340/286.02; 340/539.1; 340/539.11; 340/506; 340/3.1
(58) Field of Search ......................... 340/286.02, 539.1, 340/506, 3.1, 539.11

(56) References Cited

U.S. PATENT DOCUMENTS

| | | | | |
|---|---|---|---|---|
| 5,517,620 A | * | 5/1996 | Hashimoto et al. | ......... 709/242 |
| 6,005,603 A | * | 12/1999 | Flavin | ......................... 725/32 |
| 6,118,778 A | * | 9/2000 | Amin | ......................... 370/352 |
| 6,292,830 B1 | * | 9/2001 | Taylor et al. | ................ 709/224 |
| 6,314,093 B1 | * | 11/2001 | Mann et al. | ................. 370/351 |

FOREIGN PATENT DOCUMENTS

| | | |
|---|---|---|
| EP | 1 093 272 | 4/2001 |
| EP | 1 102 454 | 5/2001 |
| JP | 2001-77878 | 3/2001 |
| JP | 2001-145159 | 5/2001 |
| JP | 2001-186214 | 7/2001 |
| WO | WO 01/01655 | 1/2001 |

* cited by examiner

Primary Examiner—Daryl C. Pope
(74) Attorney, Agent, or Firm—Frommer Lawrence & Haug LLP; William S. Frommer

(57) ABSTRACT

The present invention relates to an information processing apparatus and information processing method for suppressing the power consumption compared with a case in which a Bluetooth connection is established at all times. When it is determined in step S221 that a network connection request is received, in step S222, a dialog box for confirming a dial-up connection is displayed. When it is determined in step S223 that a connection button is pressed, in step S226, a Bluetooth connection is established. When it is determined in step S227 that a connection with a Bluetooth device is established, in step S228, a dial-up connection is established. The present invention is applicable to camcorders.

9 Claims, 27 Drawing Sheets

FIG. 12

PPP Login :
　□□□@△△△
PPP Password :
　○×△□#&★φ
Access Point Phone Number :
　＊＊-$$$$-¥¥¥¥
POP ID :
　□□□
POP Password :
　○×△□#&★φ
E-Mail Address :
　□□□@△△△△.xxxx.ne.jp
POP Server :
　pop.△△△△.xxxx.ne.jp
SMTP Mail Server :
　mail.△△△△.xxxx.ne.jp
News Server :
　news01.xxxxx.ne.jp

FIG. 13

DI Customer ID :
　＊＊000000
DI Password :
　######
Access Point Phone Number :
　＊＊-$$$$-¥¥¥¥

FIG. 14A

| GENERAL ISP SETTING ITEMS |
|---|
| · PPP Connection ID |
| · PPP Connection Password |
| · Access Point Phone Number |
| · Primary DNS Server |
| · Secondary DNS Server |
| · Proxy Server |
| · Port Number |
| · POP Authentication ID |
| · POP Authentication Password |
| · POP Server |
| · SMTP Server |
| · Mail Address |

FIG. 14B

| SIMPLE CONNECTION SETTING ITEMS |
|---|
| · Unified ID |
| · Password |
| · Access Point Phone Number |

INFORMATION PROCESSING DEVICE AND INFORMATION PROCESSING METHOD

TECHNICAL FIELD

The present invention relates to information processing apparatuses and information processing methods, and more particularly to an information processing apparatus and information processing method for establishing, when connecting to a network via a connection based on short-range wireless communication and a connection other than the former connection, the connection based on the short-range wireless communication on ly when actually connecting to the network.

BACKGROUND ART

When connecting a personal computer to a network such as the Internet via a public circuit network, a user accesses an Internet service provider through a so-called dial-up connection. The personal computer can thus browse a web page published on the Internet and send and receive email via the Internet service provider.

The wired connection using cables has been the primary type of connectivity between the personal computer and the public circuit network. Recently, Bluetooth (trademark), which is wireless connection technology, has been drawing attention.

Bluetooth is a wireless transmission system using the 2.4 GHz band. Bluetooth technology uses short-range wireless communication for exchanging information. An object of Bluetooth technology is to easily connect cellular phones, personal computers, PDAs (Personal Digital Assistants), and peripheral devices with one another. Since this wirelss communication uses the 2.4 GHz ISM (Industry Science Medical; which is an unleased band) that can be used worldwide, a device compliant with Bluetooth technology can be used worldwide. For example, using this technology in peripheral devices of a personal computer makes all devices including a mouse, keyboard, modem, and printer wireless. Using Bluetooth technology in connectivity between devices such as a cellular phone and modem for connecting to the public circuit network and a personal computer makes cables, which used to be necessary, unnecessary.

As shown in FIG. 1, a personal computer 1 connects to a Bluetooth adapter 2 using Bluetooth-based short-range wireless communication and, from the Bluetooth adapter 2, connects to the Internet 5 via a public circuit network 3 and an Internet service provider (ISP) 4. The personal computer 1 thus becomes capable of, for example, sending and receiving email or accessing a predetermined web server (not shown) and browsing a web page. Bluetooth-based connectivity between the personal computer 1 and the Bluetooth adapter 2 is always on.

Recently, other than the personal computer 1, so-called mobile devices such as PDAs (Personal Digital Assistants) and cellular phones that the user can carry have been widely used. Such portable and network-connectable devices including these mobile devices are operated by batteries. When these devices are in Bluetooth connection always-on mode, the power consumption is increased, and the batteries are exhausted quickly.

DISCLOSURE OF INVENTION

In view of the circumstances, it is an object of the present invention to establish, when establishing a dial-up connection via short-range wireless communication, which is represented by Bluetooth, a Bluetooth connection only when connectivity is necessary and, a dial-up connection at the same time, whereby the power consumption is suppressed without requiring a user to perform complicated operations for the connections.

An information processing apparatus of the present invention includes input means for receiving input of a user operation; first connection means for establishing a first connection based on short-range wireless communication in accordance with the user operation input by the input means; second connection means for establishing a second connection in synchronization with the establishment of the first connection by the first connection means; first breaking means for breaking the second connection by the second connection means in accordance with the user operation input by the input means; and second breaking means for breaking the first connection by the first connection means in synchronization with the breaking of the second connection by the first breaking means.

The short-range wireless communication may be Bluetooth-based communication. The network may be the Internet. The second connection may be a dial-up connection. The second connection means may connect to the Internet via a public circuit network using the dial-up connection.

The information processing apparatus may further include email sending/receiving means for sending/receiving email. The email sending/receiving means may send/receive the email via the first connection established by the first connection means and the second connection established by the second connection means.

The information processing apparatus may further include browsing means for browsing a web page. The browsing means may access a predetermined server in which the web page is stored via the first connection established by the first connection means and the second connection established by the second connection means.

The information processing apparatus may further include image capturing means for capturing an image; and image processing means for performing predetermined image processing of the image captured by the image capturing means.

The information processing apparatus may further include output means for outputting the image that has undergone the image processing by the image processing means to a predetermined server. The output means may output the image to the predetermined server via the first connection established by the first connection means and the second connection established by the second connection means.

An information processing method of the present invention includes an input step of receiving input of a user operation; a first connection step of establishing a first connection based on short-range wireless communication in accordance with the user operation input by the processing in the input step; a second connection step of establishing a second connection in synchronization with the establishment of the first connection by the processing in the first connection step; a first breaking step of breaking the second connection by the processing in the second connection step in accordance with the user operation input by the processing in the input step; and a second breaking step of breaking the first connection by the processing in the first connection step in synchronization with the breaking of the second connection by the processing in the first breaking step.

A program recorded in a recording medium of the present invention includes an input step of receiving input of a user operation; a first connection step of establishing a first connection based on short-range wireless communication in accordance with the user operation input by the processing in the input step; a second connection step of establishing a second connection in synchronization with the establishment of the first connection by the processing in the first connection step; a first breaking step of breaking the second connection by the processing in the second connection step in accordance with the user operation input by the processing in the input step; and a second breaking step of breaking the first connection by the processing in the first connection step in synchronization with the breaking of the second connection by the processing in the first breaking step.

A program of the present invention includes an input step of receiving input of a user operation; a first connection step of establishing a first connection based on short-range wireless communication in accordance with the user operation input by the processing in the input step; a second connection step of establishing a second connection in synchronization with the establishment of the first connection by the processing in the first connection step; a first breaking step of breaking the second connection by the processing in the second connection step in accordance with the user operation input by the processing in the input step; and a second breaking step of breaking the first connection by the processing in the first connection step in synchronization with the breaking of the second connection by the processing in the fir st breaking step.

A user operation is input. In accordance with the input user operation, a first connection based on short-range wireless communication is established. In synchronization with the establishment of the first connection, a second connection is established. In accordance with the input user operation, the second connection is broken. In synchronization with the breaking of the second connection, the first connection is broken.

BRIEF DESCRIPTION OF THE DRAWINGS

FIG. 12 is an illustration of an example of ISP-A setting information in step S79 of FIG. 11.

FIG. 13 is an illustration of an example of camcorder setting information in step S80 of FIG. 11.

FIG. 14A is an illustration of general ISP setting items when connecting to the Internet.

FIG. 14B is an illustration of easy connection setting items when connecting to the Internet.

BEST MODE FOR CARRYING OUT THE INVENTION

Figure 1:
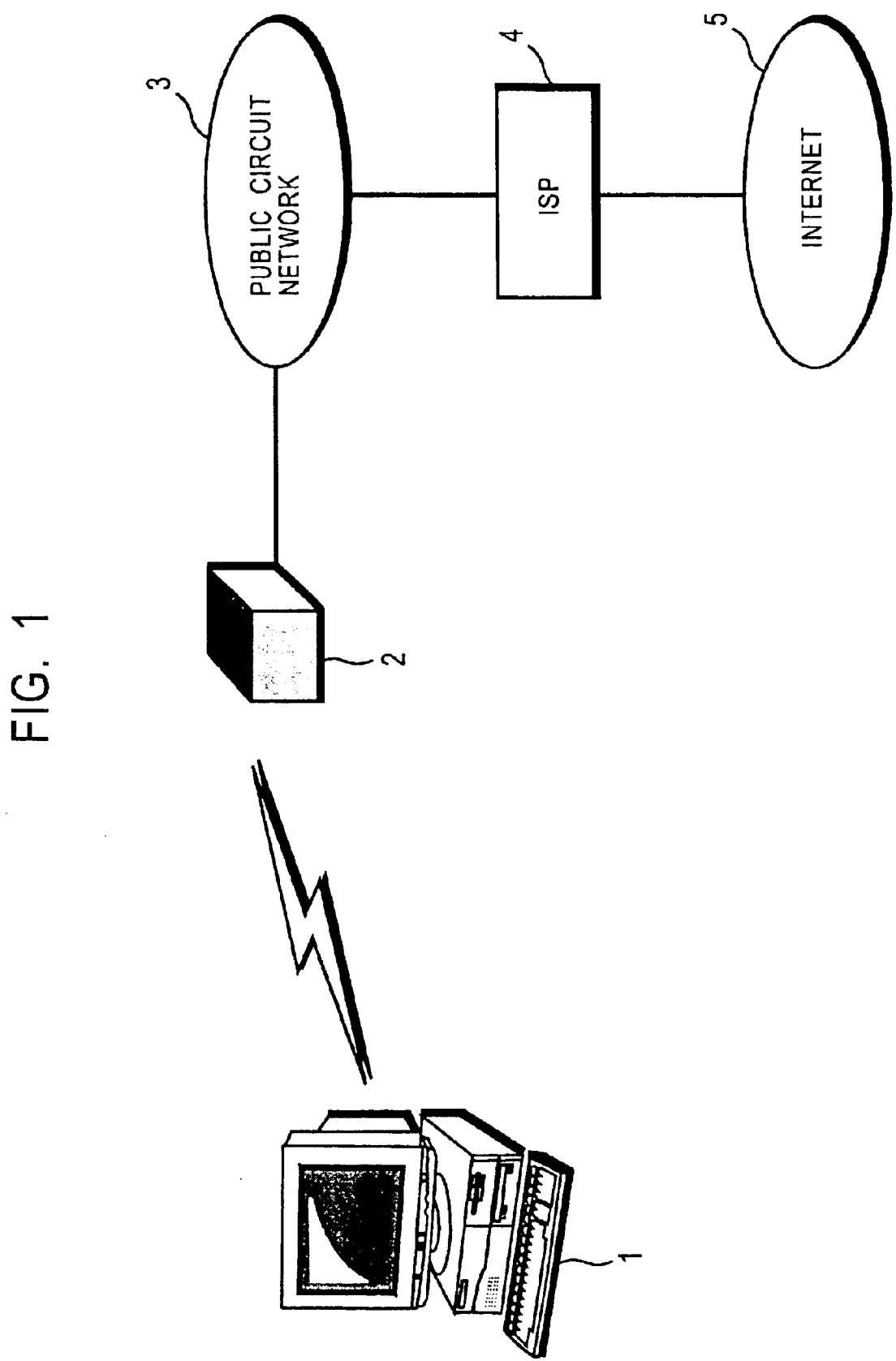
FIG. 1 is an illustration of the configuration of a known network connection system.
Figure 2:
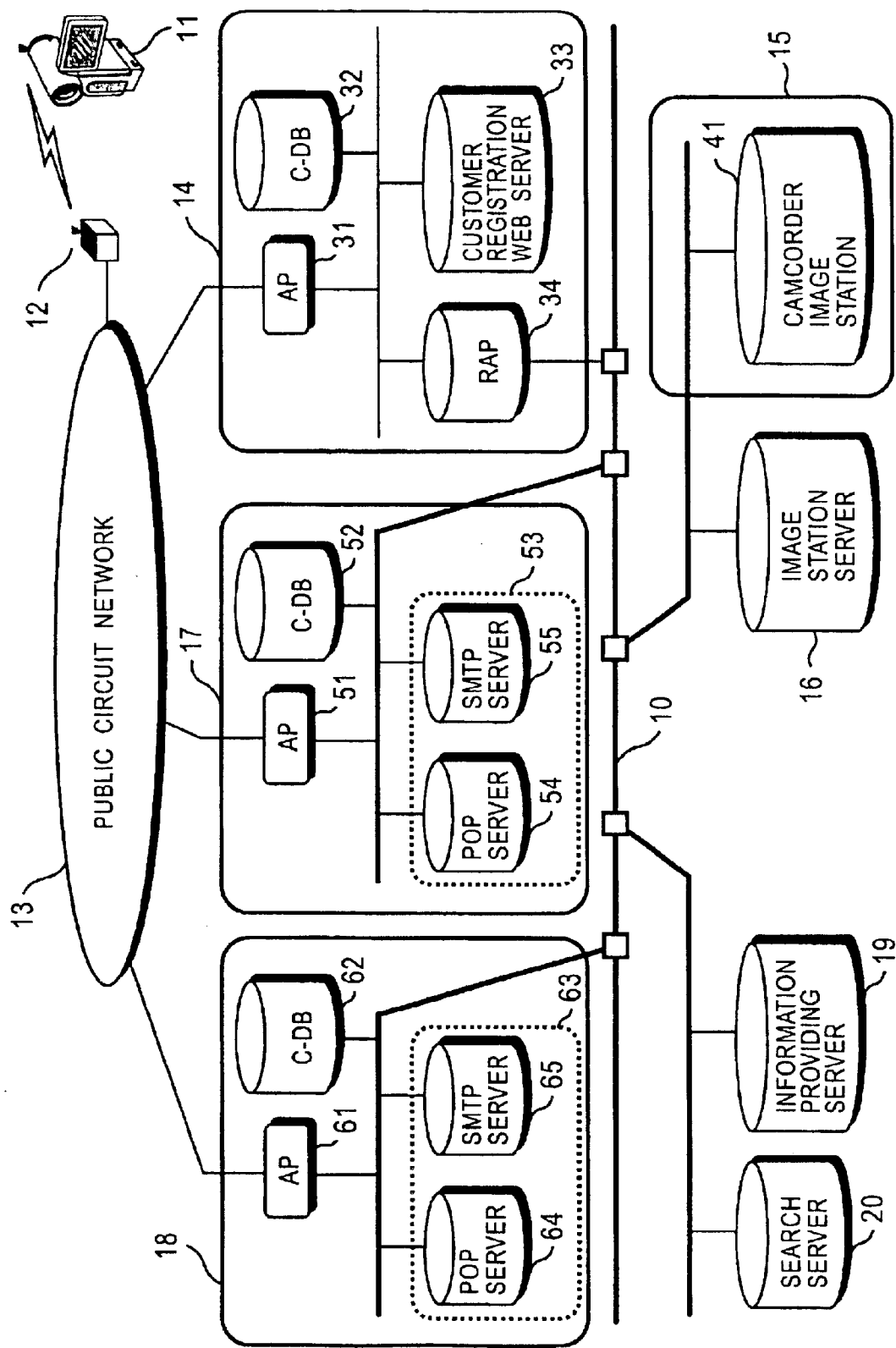
FIG. 2 is an illustration of the configuration of a service providing system to which the present invention is applied.

FIG. 2 shows an example of the configuration of a service providing system to which the present invention is applied. In the service providing system, a network system 14, a network service business center 15, an image station server 16, an Internet service provider A (ISP-A) 17, an Internet service provider B (ISP-B) 18, an information providing server 19, and a search server 20 are connected to the Internet 10.

The network system 14, the Internet service provider A 17, and the Internet service provider B 18 are also connected to a public circuit network 13. Furthermore, a Bluetooth adapter 12 is connected to the public circuit network 13. A camcorder 11 can connect to the Bluetooth adapter 12 by short-range wireless communication based on Bluetooth (trademark) and, from the Bluetooth adapter 12, can connect via the public circuit network 13 to the network system 14, the Internet service provider A 17, or the Internet service provider B 18.

The network system 14 is formed of an access point (AP) 31, a customer database (C-DB) 32, a customer registration web server 33, and a registration authentication platform (RAP) 34.

The access point 31 is connected to the public circuit network 13. The customer database 32 registers various information on a user who has purchased the camcorder 11. The customer registration web server 33 controls the registration processing of the camcorder 11. The registration authentication platform 34 performs the user authentication processing with the network system 14.

Although the access point 31, the customer database 32, the customer registration web server 33, and the registration authentication platform 34 are provided separately in the example shown in FIG. 2, they may be integrated.

The network service business center 15 has a camcorder image station 41. The camcorder image station 41 registers and manages image data sent from the camcorder 11.

The image station server 16 registers and manages image data sent from a personal computer, which is not shown.

The Internet service provider A 17 has an access point 51, a customer database 52, and a mail server 53. The mail server 53 has a POP server 54 and an SMTP (Simple Mail Transfer Protocol) server 55.

The Internet service provider A 17 is a specific Internet service provider and offers an Internet connection service provided by the same provider as that of the service providing system shown in FIG. 2 or by a partner company thereof.

The access point 51 performs the communication processing with the public circuit network 13. The customer database 52 registers various information on a user of the Internet service provider A 17. The POP server 54 mainly manages the mail sending/receiving processing with the camcorder 11. The SMTP server 55 mainly manages the mail sending/receiving processing with a different SMTP server (in this case, an SMTP server 65 of the Internet service provider B 18).

The Internet service provider B 18 has an access point 61, a customer database 62, and a mail server 63 formed of a POP server 64 and an SMTP server 65. The basic configuration is similar to that of the Internet service provider A 17.

The information providing server 19 provides, for example, various information concerning a predetermined company's products. The search server 20 provides a service of searching the Internet 10 for various public information.

Figure 3:
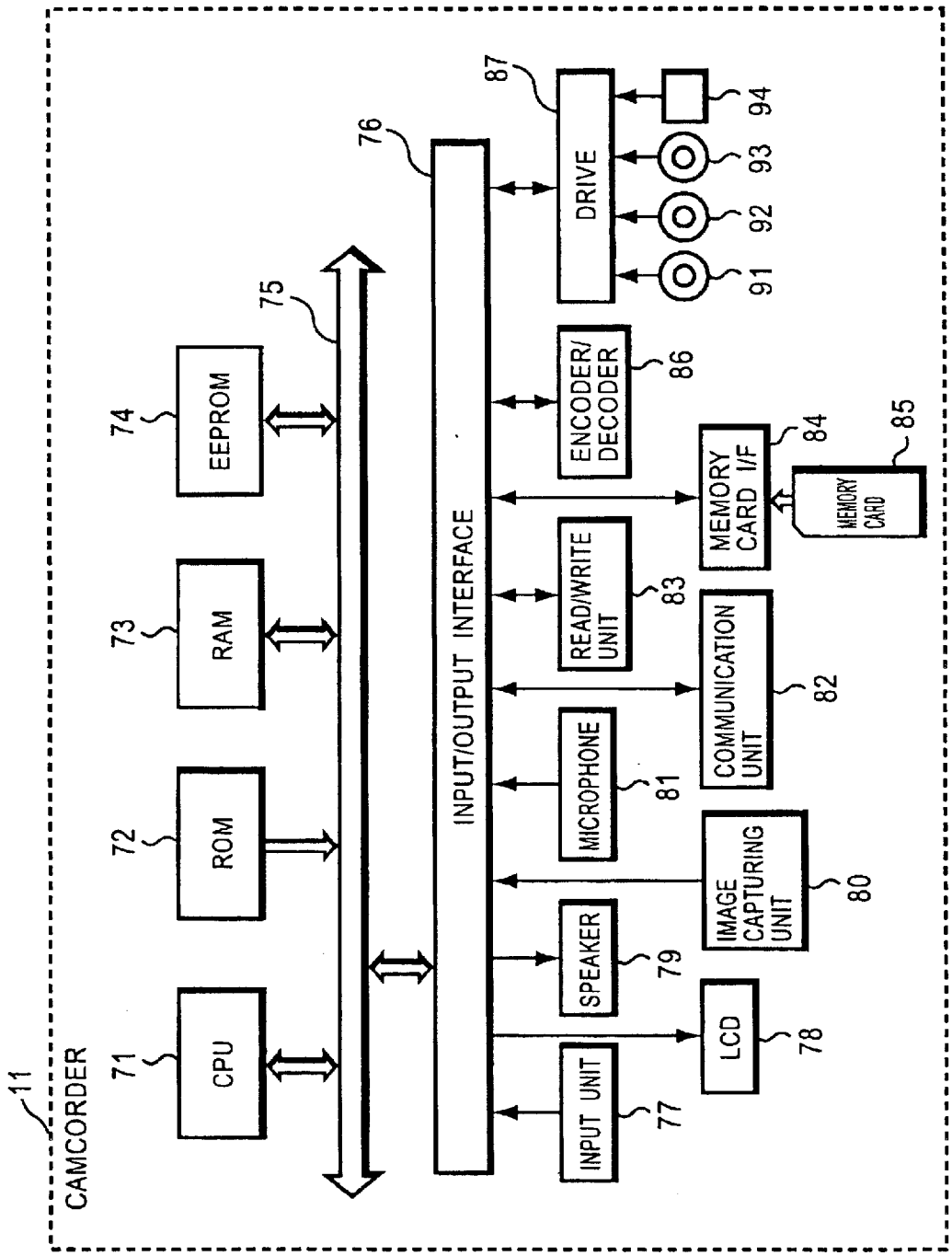
FIG. 3 is a block diagram of the configuration of a camcorder of FIG. 2.

FIG. 3 shows an example of the configuration of the camcorder 11. The camcorder 11 is a video cassette recorder integrated with a camera and has a function for accessing the Internet 10. In FIG. 3, a CPU (Central Processing Unit) 71 performs various types of processing in accordance with a program stored in a ROM (Read Only Memory) 72 or a program loaded into a RAM (Random Access. Memory) 73. If necessary, the RAM 73 also stores data necessary for the CPU 71 to perform various types of processing. An EEPROM (Electrically Erasable Programmable Read Only Memory) 74 stores data that must be stored after the power is turned off.

The CPU 71, the ROM 72, the RAM 73, and the EEPROM 74 are connected to one anther by a bus 75. An input/output interface 76 is connected to the bus 75.

An input unit 77 formed of various buttons and switches, an LCD (Liquid Crystal Display) 78, a speaker 79, an image capturing unit 80 formed of a CCD (Charge Coupled Device) or the like, a microphone 81 that collects sound and generates an audio signal, and a communication unit 82 that performs short-range wireless communication with the Bluetooth adapter 12 in accordance with Bluetooth are connected to the input/output interface 76.

A read/write unit 83 writes video data captured by the image capturing unit 80, audio data generated by the microphone 81, or the like on a placed cassette magnetic tape. The read/write unit 83 reads the video data and audio data written on the cassette magnetic tape, outputs an image corresponding to the video data to the LCD 78 and displays the image on the LCD 78, and outputs the audio data to the speaker 79 and outputs the audio from the speaker 79.

A memory card interface 84 performs the writing processing and the reading processing of data to and from a memory card 85, which is a portable semiconductor memory, when the memory card 85 is placed. On the memory card 85, the video data captured by the image capturing unit 80 and the audio data generated by the microphone 81 can be written. In addition, various data obtained from the communication unit 82 via the Internet 10 can be written on the memory card 85.

An encoder/decoder 86 encodes or decodes the video data in the MPEG (Moving picture Experts Group) or JPEG (Joint Photographic Coding Experts Group) format.

If necessary, a drive 87 is connected to the input/output interface 76. If necessary, a magnetic disk 91, an optical disk 92, a magneto-optical disk 93, or a semiconductor memory 94 is placed on the drive 87. A computer program read from the placed medium is installed into the RAM 73 if necessary.

Figure 4:
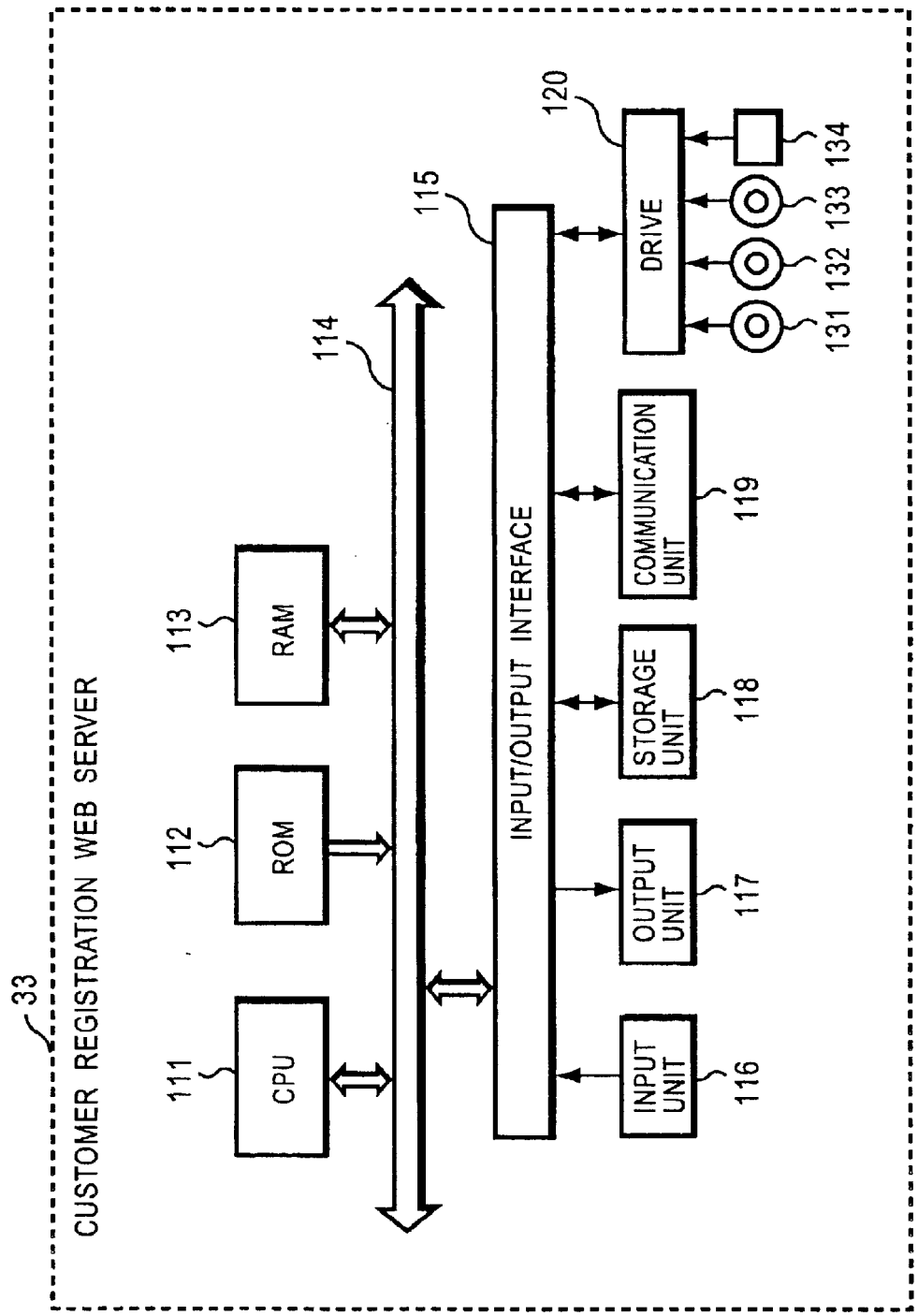
FIG. 4 is a block diagram of the configuration of a customer registration web server of FIG. 2.

FIG. 4 shows an example of the configuration of the customer registration web server 33. In FIG. 4, a CPU 111 performs various types of processing in accordance with a program stored in a ROM 112 or a program loaded from a storage unit 118 into a RAM 113. The RAM 113 also stores data necessary for the CPU 111 to perform various types of processing if necessary.

The CPU 111, the ROM 112, and the RAM 113 are connected with one another by a bus 114. An input/output interface 115 is connected to the bus 114.

An input unit 116 formed of a keyboard, a mouse, or the like, an output unit 117 formed of a display such as a CRT or LCD, a speaker, and the like, the storage unit 118 formed of a hard disk or the like, and a communication unit 119 formed of a modem, a terminal adapter, or the like are connected to the input/output interface 115. The communication unit 119 performs the communication processing via a network including the Internet 10.

If necessary, a drive 120 is connected to the input/output interface 115. If necessary, a magnetic disk 131, an optical disk 132, a magneto-optical disk 133, or a semiconductor memory 134 is placed on the drive 120. A computer program read from the placed medium is installed into the storage unit 118 if necessary.

Although not shown in the drawings, the configuration of the access point 31, the customer database 32, and the registration authentication platform 34 is basically similar to that of the customer registration web server 33 when these components are provided separately from the customer registration web server 33.

Figure 5:
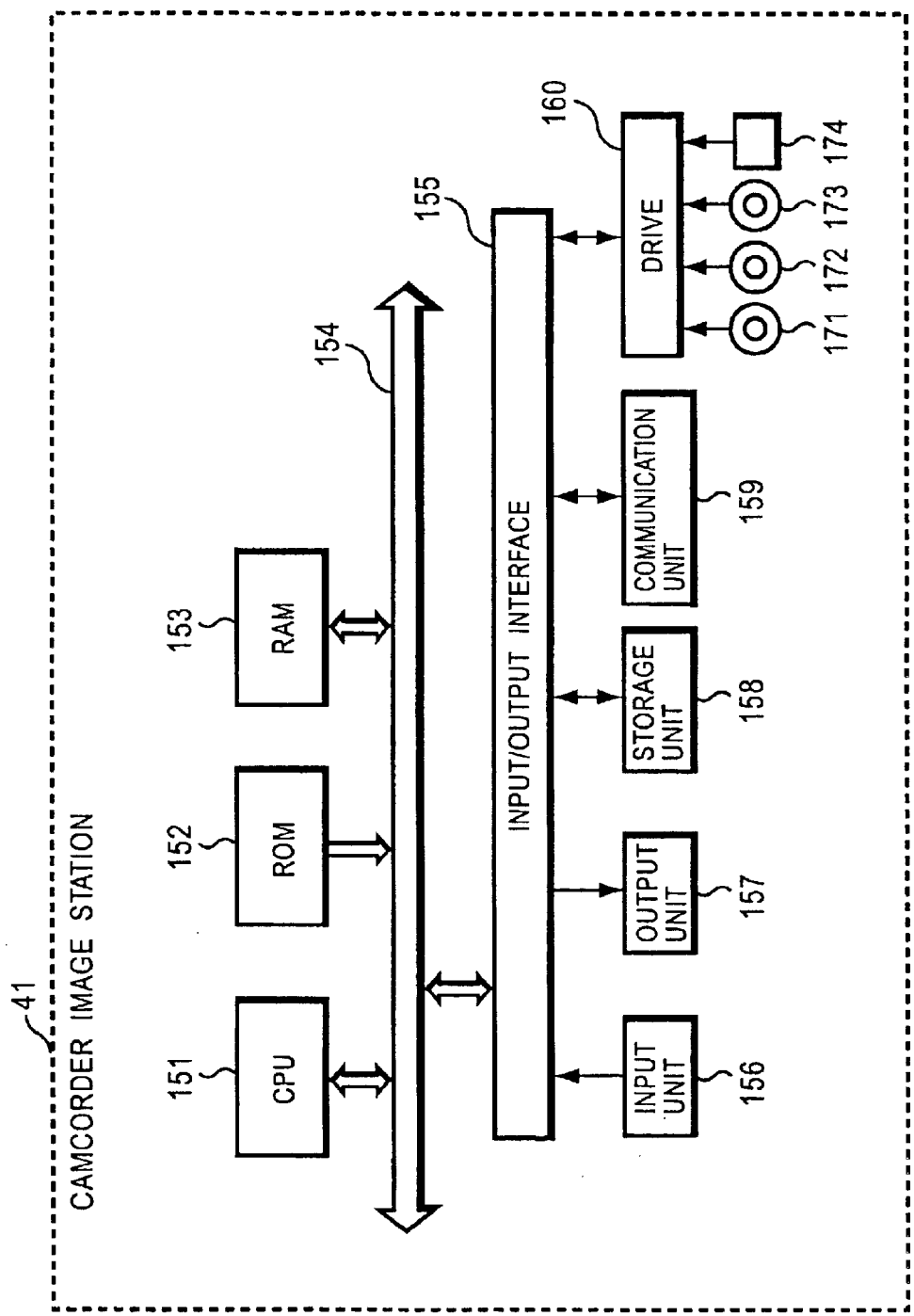
FIG. 5 is a block diagram of the configuration of a camcorder image station of FIG. 2.

FIG. 5 shows an example of the configuration of the camcorder image station 41 forming the network service business center 15. The configuration of a CPU 151 to a semiconductor memory 174 forming the camcorder image station 41 is basically similar to that of the CPU 111 to the semiconductor memory 134 forming the customer registration web server 33 of FIG. 4. The corresponding names have the corresponding functions, and a description thereof is repetitive and thus omitted.

Figure 6:
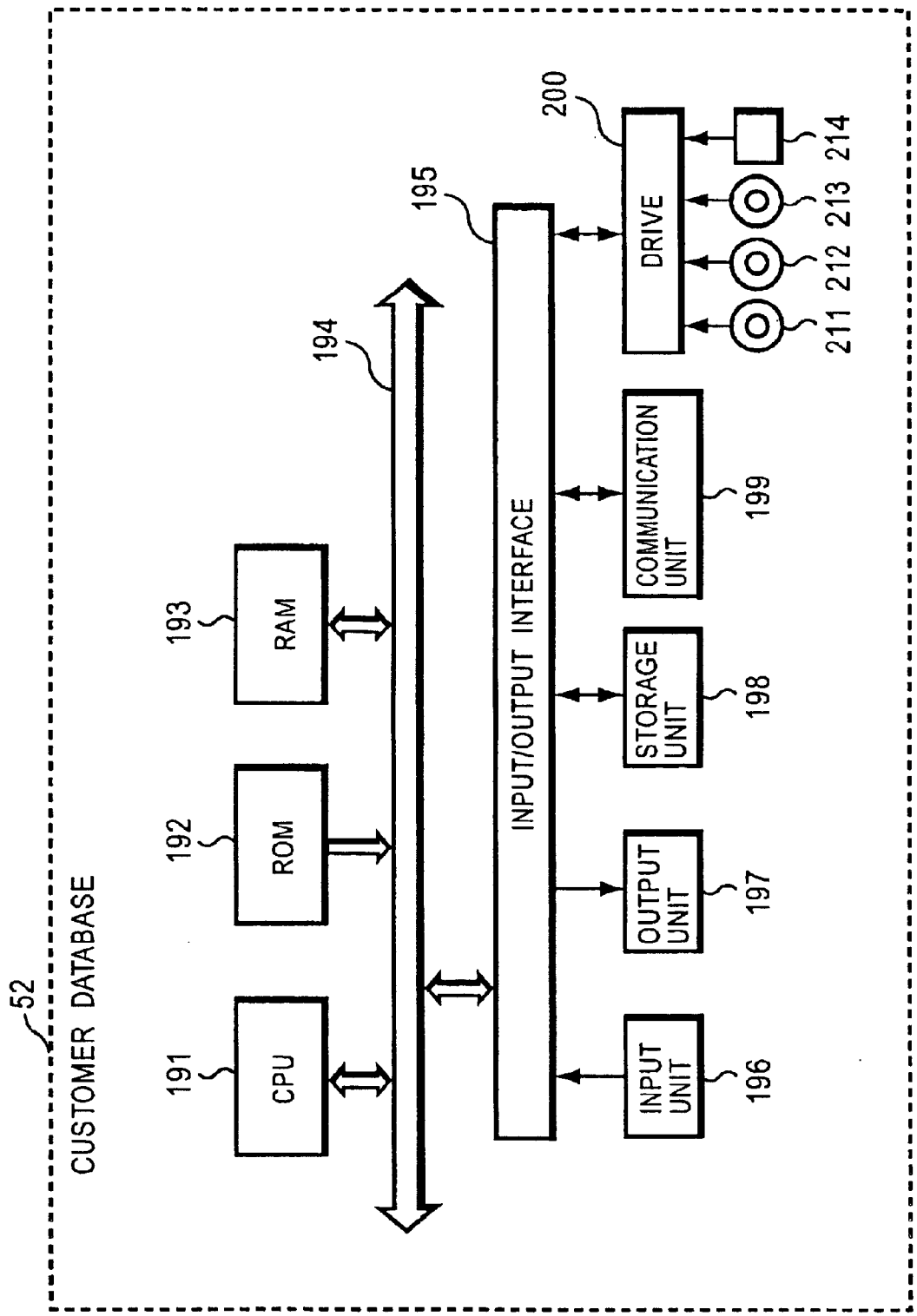
FIG. 6 is a block diagram of the configuration of a customer database of FIG. 2.

FIG. 6 shows an example of the configuration of the customer database 52 of the Internet service provider A 17. The configuration of a CPU 191 to a semiconductor memory 214 of the customer database 52 is basically similar to that of the CPU 111 to the semiconductor memory 134 of the customer registration web server 33 of FIG. 4. The corresponding names have the corresponding functions, and a description thereof is repetitive and thus omitted.

When the access point 51 and the mail server 53 (the POP server 54 and the SMTP server 55) are provided separately from the customer database 52, the configuration thereof is basically similar to that of the customer database 52 of FIG. 6.

A user who has purchased the camcorder 11 can receive the services provided by the service providing system of FIG. 2. In order to receive the services, the user of the camcorder 11 performs the processing to register the camcorder 11 (and the user thereof) with the network system 14. When the camcorder 11 is purchased, the Bluetooth adapter 12 accompanies the camcorder 11 (if not, purchased separately). By connecting the Bluetooth adapter 12 to the public circuit network 13, the user registers the camcorder 11 (and the user thereof) with the network system 14.

Figure 7:
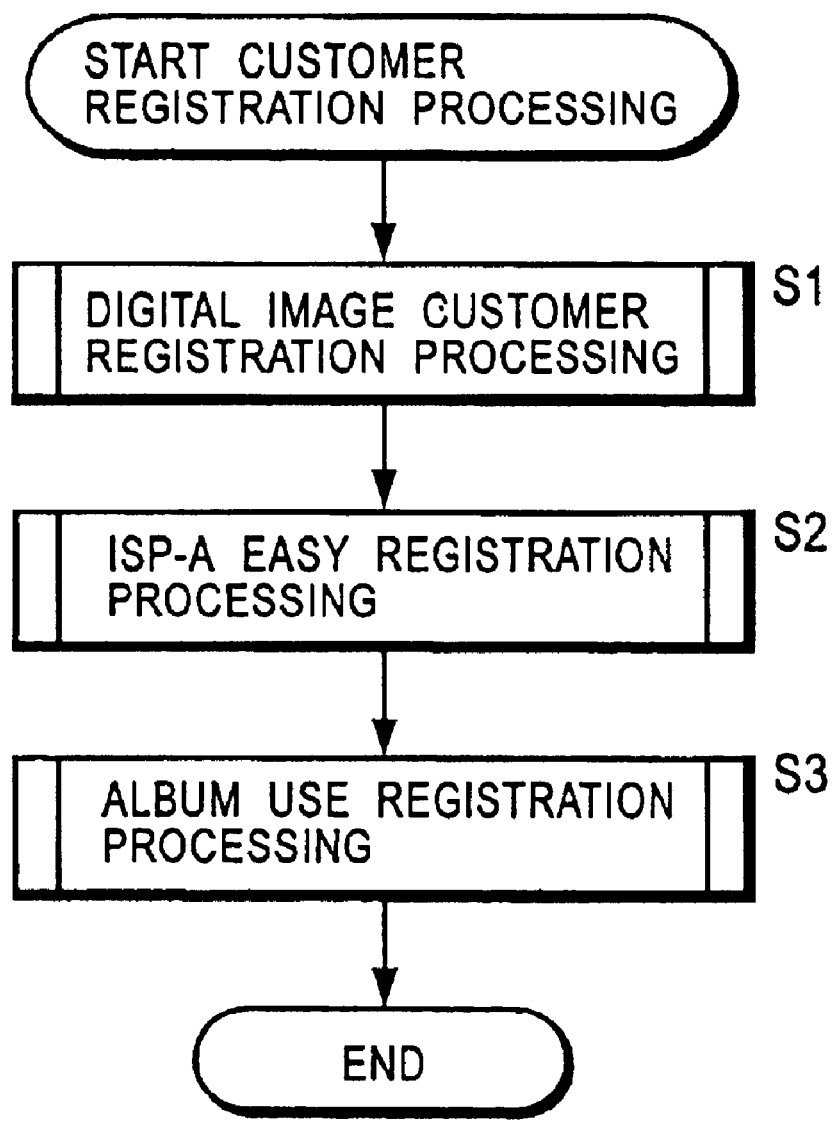
FIG. 7 is a flowchart for describing the customer registration processing by the service providing system of FIG. 2.

When the registration processing is performed, the processing shown by a flowchart of FIG. 7 is performed in the service providing system. Specifically, in step S1, the network system 14 performs the digital image customer registration processing. In step S2, the Internet service provider A 17 performs the ISP-A easy registration processing. In step S3, the network service business center 15 performs the album use registration processing.

The processing in steps S1 to S3 will now be described separately.

Figure 8:
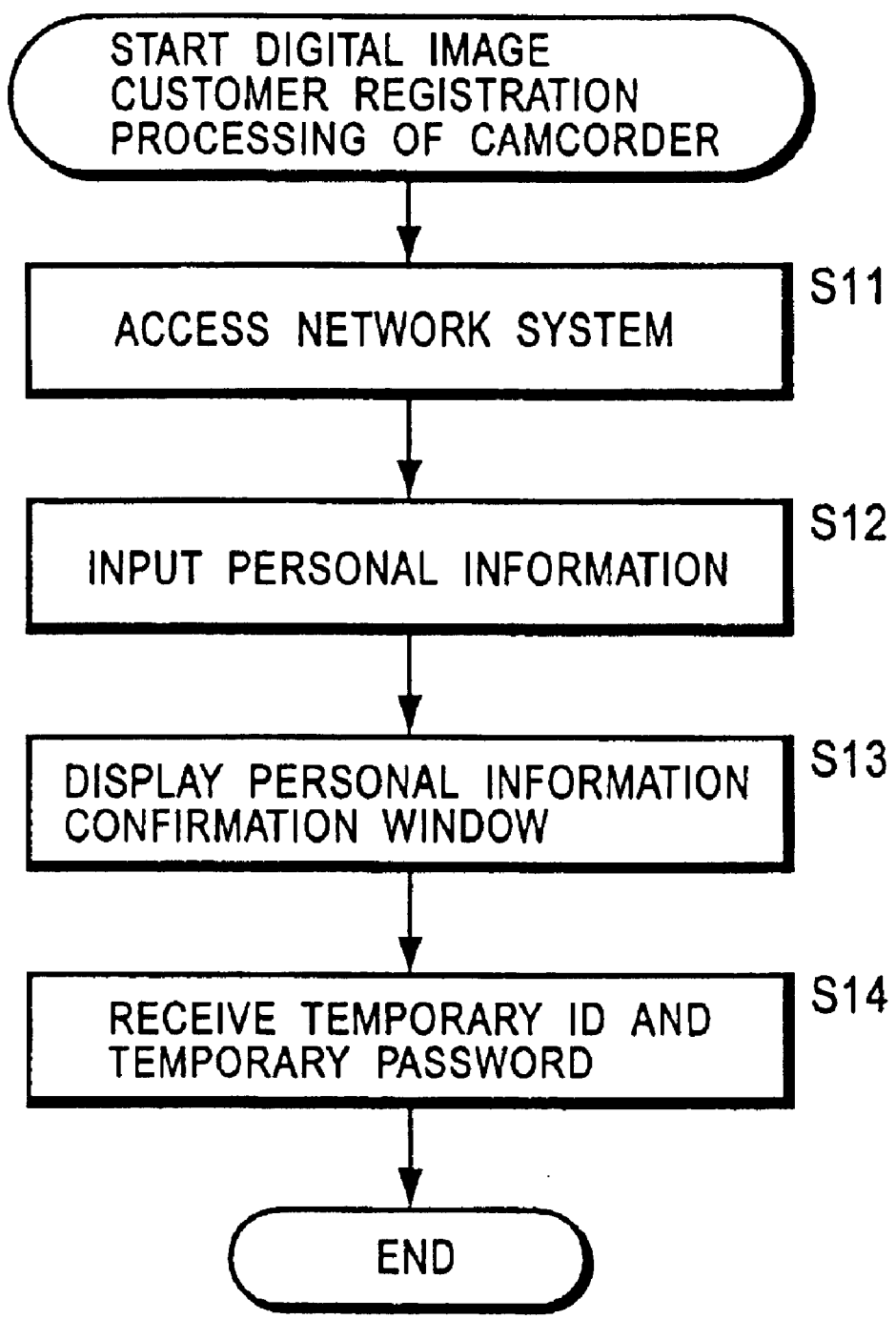
FIG. 8 is a flowchart for describing the digital image customer registration processing by the camcorder of FIG. 2.
Figure 9:
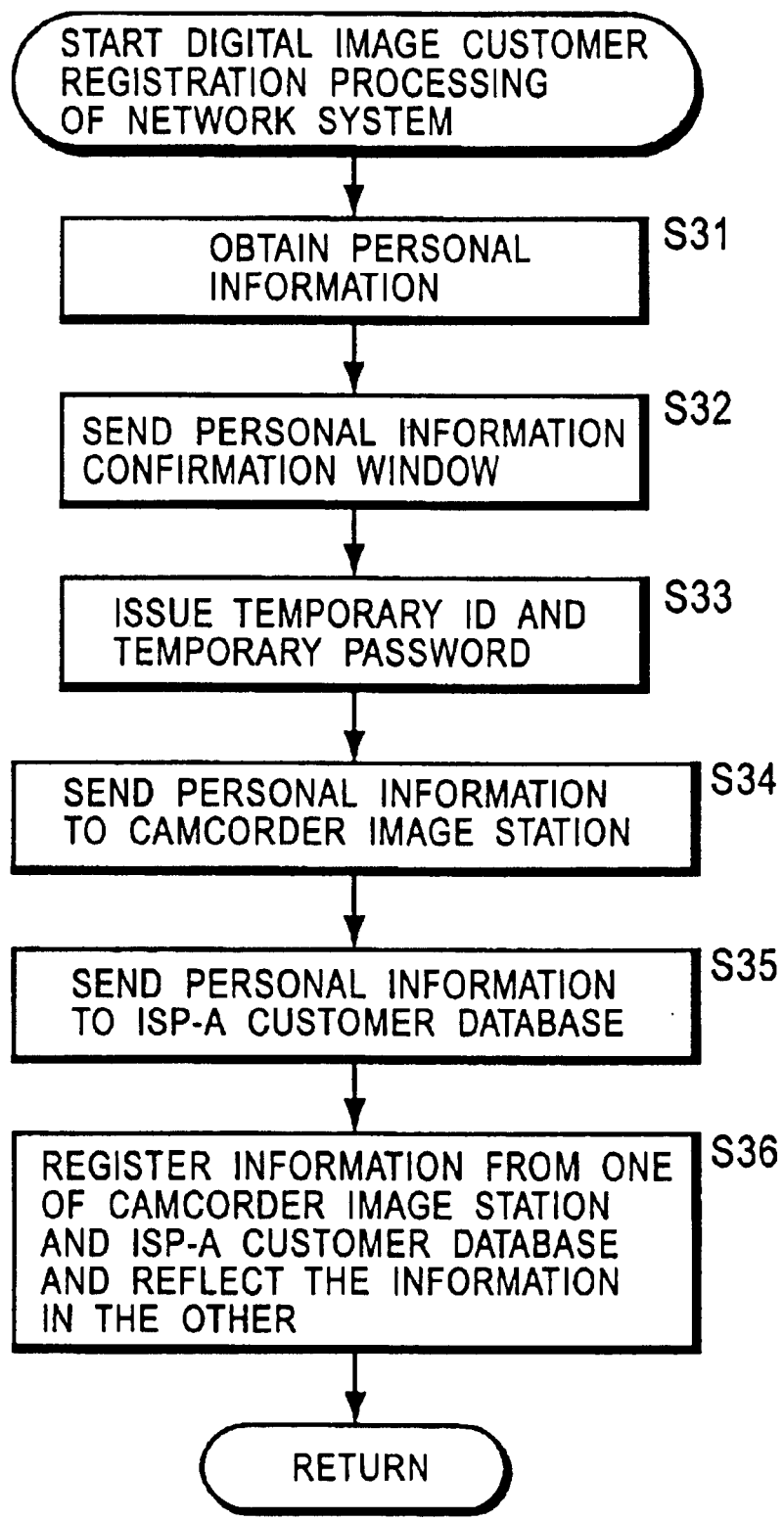
FIG. 9 is a flowchart for describing the digital image customer registration processing by a network system of FIG. 2.

With reference to flowcharts of FIGS. 8 and 9, the digital image customer registration processing by the network system 14 is described. FIG. 8 shows the processing by the camcorder 11 when performing the registration processing, and FIG. 9 shows the corresponding processing by the customer registration web server 33.

In step S11, the user of the camcorder 11 operates the input unit 77 and gives a command to access the network system 14. The access destination is stored in advance in the ROM 72. The CPU 71 controls the communication unit 82 on the basis of information stored in the ROM 72 and gives a command to access the access point 31 of the network system 14. In response to the command, the communication unit 82 performs short-range wireless communication with the Bluetooth adapter 12 and, from the Bluetooth adapter 12, accesses the access point 31 of the network system 14 via the public circuit network 13.

The first access to the network system 14 is made possible using a guide ID. Specifically, when the user inputs, for example, "GUEST" serving as an ID, the registration authentication platform 34 permits access. When the registration authentication platform 34 permits access from the camcorder 11, the registration authentication platform 34 transfers the right to manage the processing for the camcorder 11 from this point onward to the customer registration web server 33.

In step S31 of FIG. 9, the CPU 111 of the customer registration web server 33 requests the user of the camcorder 11 to input personal information. The request is output from the communication unit 119 and sent to the camcorder 11 via the access point 31, the public circuit network 13, and the Bluetooth adapter 12.

When the CPU 71 of the camcorder 11 receives the request via the communication unit 82, in step S12, the CPU 71 outputs a message in response to the request to the LCD 78, and the message is displayed on the LCD 78.

The user of the camcorder 11 operates the input unit 77 and inputs personal information on the basis of the message. The personal information includes a 16-digit registration code formed of numerals and alphabet (the registration code is printed on a postcard attached to the camcorder 11 when the camcorder 11 is purchased), the user's postal code, name, address, birth date, sex, phone number, email address, etc., the serial number of the camcorder 11, and the purchased date.

When the CPU 71 of the camcorder 11 inputs the personal information in step S12, the personal information is sent to the network system 14.

Specifically, the CPU 71 controls the communication unit 82 and causes the communication unit 82 to send the input personal information to the network system 14. The personal information is supplied to the customer registration web server 33 via the Bluetooth adapter 12, the public circuit network 13, and the access point 31.

When the CPU 111 of the customer registration web server 33 obtains the personal information via the communication unit 119 in step S31 of FIG. 9, the CPU 111 supplies the personal information to the RAM 113 and temporarily stores the information in the RAM 113.

When the personal information is registered in the RAM 113, in step S32, the CPU 111 generates a personal information confirmation window and sends it from the communication unit 119 to the camcorder 11. The personal information confirmation window data is supplied from the access point 31 to the Bluetooth adapter 12 via the public circuit network 13, and the data is sent from the Bluetooth adapter 12 to the camcorder 11.

When the CPU 71 of the camcorder 11 receives the personal information confirmation window data via the communication unit 82, in step S13 of FIG. 8, the CPU 71 temporarily stores the data in the RAM 73, subsequently rereads the data, outputs the data to the LCD 78, and displays the data on the LCD 78. Accordingly, the LCD 78 displays the personal information input from the user of the camcorder 11 for confirmation.

When the user operates the input unit 77 and inputs that the user has confirmed the personal information input by the user, the CPU 71 sends a confirmation signal from the communication unit 82 to the customer registration web server 33.

When the CPU 111 of the customer registration web server 33 receives the confirmation signal via the communication unit 119, in step S32 of FIG. 9, the CPU 111 transfers the personal information registered the RAM 113 to the storage unit 118 and stores the personal information in the storage unit 118.

In step S33, the CPU 111 issues a temporary ID and temporary password to the user of the camcorder 11. The temporary ID and the temporary password are output from the communication unit 119 and sent to the camcorder 11 via the access point 31, the public circuit network 13, and the Bluetooth adapter 12.

When the CPU 71 of the camcorder 11 receives in step S14 of FIG. 8 the temporary ID and the temporary password via the communication unit 82, the CPU 71 supplies the temporary ID and the temporary password to the LCD 78 and displays them on the LCD 78 or to the EEPROM 74 and stores them in the EEPROM 74.

As discussed above, in step S33, the customer registration web server 33 supplies the personal information on the user of the camcorder 11, which is registered in the storage unit 118, to the customer database 32 and registers the personal information in the customer database 32.

In step S34, the customer database-32 supplies the personal information to the camcorder image station 41 of the network service business center 15 via the Internet 10.

When the CPU 151 of the camcorder image station 41 receives the personal information sent from the network system 14 via the communication unit 159, the CPU 151 supplies the personal information to the storage unit 158 and stores the personal information in the storage unit 158 (step S121 of FIG. 16, which will be described later).

In step S35, the customer database 32 also sends the personal information on the camcorder 11 to the customer database 52 of the Internet service provider A 17.

The customer database 52 of the Internet service provider A 17 registers the personal information on the camcorder 11, which is sent from the network system 14 via the Internet 10 (S71 of FIG. 11, which will be described later).

When the personal information on the user of the camcorder 11 is subsequently changed at the network service business center 15, in step S36, the customer database 32 of the network system 14 receives the changed personal information from the camcorder image station 41 via the Internet 10 and registers therein the changed personal information. The customer database 32 supplies the updated personal information to the customer database 52 of the Internet service provider A 17 over the Internet 10 and registers the updated personal information in the customer database 52.

In contrast, when the Internet service provider A 17 changes the personal information on the user of the camcorder 11, the changed personal information is registered in the customer database 52. The customer database 52 notifies the customer database 32 of the network system 14 of the changed personal information via the Internet 10. The customer database 32 records the input personal information over the old personal information and updates the personal information.

At this time, the customer database 32 sends the updated personal information to the camcorder image station 41 of the network service business center 15 via the Internet 10.

The camcorder image station 41 updates the old personal information with the input personal information.

As discussed above, when the personal information is updated in one of the network system 14, the network service business center 15, and the Internet service provider A 17, the updated information is immediately reflected in the other two in real time.

As discussed above, when the user of the camcorder 11 is registered with the customer database 32 of the network system 14, subsequently, the network system 14 notifies the user of the camcorder 11 of various information concerning the camcorder 11 via the Internet 10 or by postcard if necessary.

After the digital image customer registration processing is completed in the above described manner, the ISP-A easy registration processing is performed. Specifically, when the customer registration processing is completed, the customer registration web server 33 transfers the right to manage the processing for the camcorder 11 from this point onward to the customer database 52 of the Internet service provider A 17.

Figure 10:
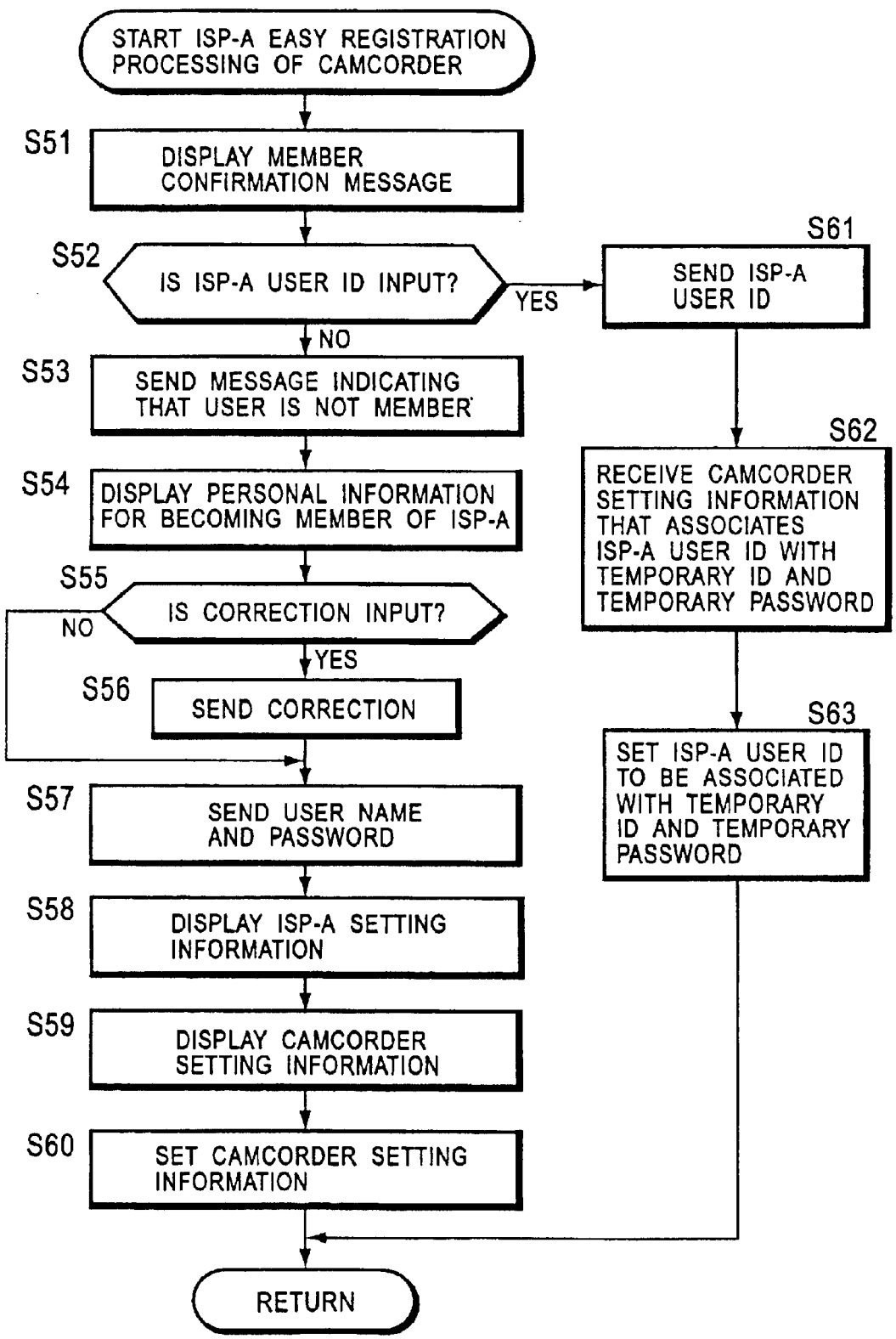
FIG. 10 is a flowchart for describing the ISP-A easy registration processing by the camcorder of FIG. 2.

Subsequently, the ISP-A easy registration processing is performed between the camcorder 11 and the customer database 52 of the Internet service provider A 17. FIG. 10 shows the processing by the camcorder 11 in this case, and FIG. 11 shows the corresponding processing by the customer database 52.

Figure 11:
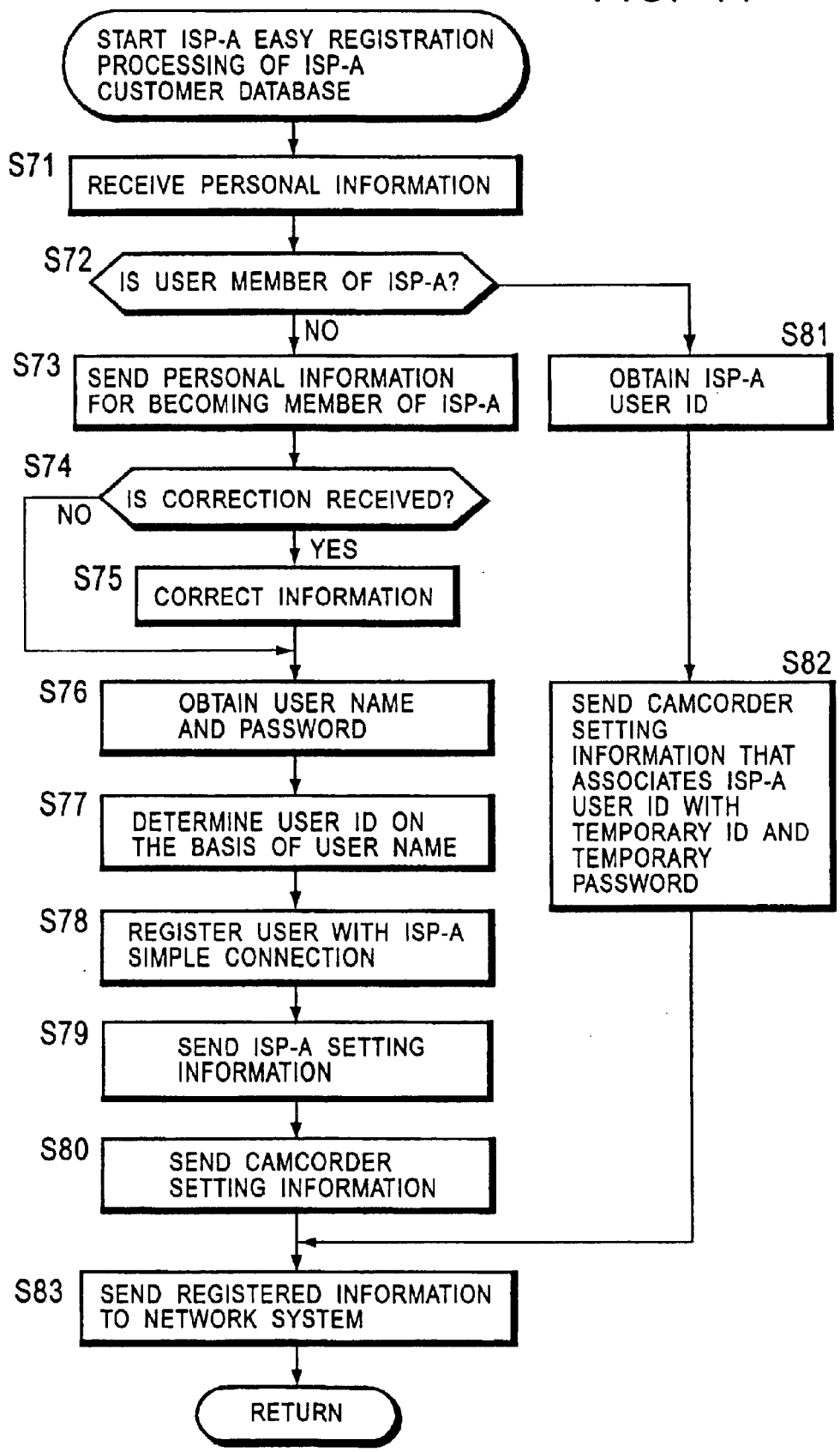
FIG. 11 is a flowchart for describing the ISP-A easy registration processing by a customer database of an Internet service provider A of FIG. 2.

When the CPU 191 of the customer database 52 of the Internet service provider A 17 receives in step S71 of FIG. 11 the personal information sent from the customer database 32 of the network system 14, the CPU 191 supplies the personal information to the storage unit 198 and stores the personal information in the storage unit 198.

When the customer database 52 of the Internet service provider A 17 receives the personal information on the camcorder 11 in step S71, the customer database 52 requests the camcorder 11 to input whether or not the user of the camcorder 11 is already a member of the Internet service provider A 17 and, when the user is a member, to input a user ID for the Internet service provider A 17.

When the CPU 71 of the camcorder 11 receives the request, in step S51 of FIG. 10, the CPU 71 outputs a message in response to the request to the LCD 78 and displays the message on the LCD 78. The user views the displayed message and, when the user is already a member of the Internet service provider A 17, inputs the user ID by operating the input unit 77. When the user is not a member, the user inputs that the user is not a member. In step S52, the CPU 71 of the camcorder 11 determines whether or not the user ID for the Internet service provider A 17 is input. When information indicating that the user is not a member of the Internet service provider A 17 is input, in step S53, the CPU 71 sends the information to the customer database 52 of the Internet service provider A 17 via the communication unit 82.

When the CPU 191 of the customer database 52 receives the input via the communication unit 199, in step S72 of FIG. 11, the CPU 191 determines that the user is not a member of the Internet service provider A 17. In step S73, the CPU 191 sends personal information for becoming a member of the Internet service provider A 17. The personal information is basically the same as the information that has been sent from the network system 14 by the processing in step S35 of FIG. 9 and that has been received and stored in step S71.

When the CPU 71 of the camcorder 11 receives the personal information for becoming a member of the Internet service provider A 17 via the communication unit 82, in step S54 of FIG. 10, the CPU 71 outputs the personal information to the LCD 78 and displays the personal information on the LCD 7B.

Since the personal information is the personal information input by the user of the camcorder 11 when the user has registered himself/herself with the network system 14, the personal information basically has no error. The user views the displayed personal information and makes sure whether or not the personal information needs to be corrected. When the personal information needs to be corrected, the user operates the input unit 77 and inputs correction.

In step S55, the CPU 71 of the camcorder 11 determines whether or not correction is input. When correction is input, in step S56, the CPU 71 sends a corrected item(s) from the communication unit 82 to the customer database 52 of the Internet service provider A 17. When no correction is input, the processing in step S56 is skipped.

In step S74 of FIG. 11, the CPU 191 of the customer database 52 of the Internet service provider A 17 determines whether or not correction is received via the communication unit 199. When correction is received, in step S75, the CPU 191 corrects the already registered personal information on the basis of the received correction details. When no correction is received, the processing in step S75 is skipped.

As discussed above, the personal information is basically the same as that on the user who has purchased the camcorder 11 and who has registered himself/herself with the network system 14 (of the personal information, only information necessary for the user to become a member of the Internet service provider A 17 is displayed). Accordingly, the user is not required to again input items which are basically the same as those input to register himself/herself with the network system 14 in order to become a member of the Internet service provider A 17. As a result, the user-friendliness is improved.

In step S57, the CPU 71 of the camcorder 11 displays on the LCD 78 a message prompting the user to input a user name and password in accordance with an inputting guidance from the customer database 52. The user of the camcorder 11 operates the input unit 77 in accordance with the message and inputs a user name and password the user uses to use the Internet service provider A 17. The CPU 71 sends the input user name and password to the customer database 52 of the Internet service provider A 17 via the communication unit 82.

When the CPU 191 of the customer database 52 receives in step S76 the user name and password via the communication unit 199, the CPU 191 determines whether or not the user name and password are already used by a different user on the basis of data stored in the storage unit 198. When the user name and password are already used by a different user, the CPU 191 sends a message indicating so from the communication unit 199 to the camcorder 11.

When the CPU 71 of the camcorder 11 receives the message via the communication unit 82, the CPU 71 displays the message on the LCD 78. When the user of the camcorder 11 views the displayed message and determines that the input user name and password are already registered, the user inputs a new user name and password.

Accordingly, when the user name and password are sent from the camcorder 11, the CPU 191 of the customer database 52 obtains the user name and password via the communication unit 199 in step S76 of FIG. 11. In step S77, the CPU 191 determines a user ID based on the user name. The user ID is for the membership in the Internet service provider A 17.

In the service providing system, the common ID and password are used by the network system 14, the network service business center 15, and the Internet service provider A 17. As discussed above, when the user is registered with the network system 14, the user of the camcorder 11 is already given the temporary ID and the temporary password (step S14 of FIG. 8 and step S33 of FIG. 9).

In order to enable the user to receive the services in the Internet service provider A 17 on the basis of the temporary ID and the temporary password, in step S78, the CPU 191 generates a table describing the association relationship for associating the temporary ID and the temporary password, which are issued by the network system 14 in step S33 of FIG. 9 and which are received by the processing in step S71, with the user ID determined in step S77 and registers the table with the ISP-A easy connection.

Accordingly, when the user of the camcorder 11 accesses the Internet service provider A 17 on the basis of the temporary ID and the temporary password, which are issued by the network system 14 in step S33 of FIG. 9 and which are received by the camcorder 11 in step S14 of FIG. 8, the customer database 52 searches the table for the user ID associated with the temporary ID and the temporary password. As a result, the user of the camcorder 11 is enabled to use the services provided by the Internet service provider A 17.

As discussed above, when the registration of the user of the camcorder 11 as a member of the Internet service provider A 17 is completed, the CPU 191 sends in step S79 setting information necessary for accessing the Internet service provider A 17 to the camcorder 11.

When the CPU 71 of the camcorder 11 receives the ISP-A setting information from the Internet service provider A 17, in step S58 of FIG. 10, the CPU 71 outputs the ISP-A setting information to the LCD 78 and displays the information on the LCD 78. The user thus can confirm the ISP-A setting information. The ISP-A setting information describes, for example, as shown in FIG. 12, PPP login, PPP password, access point phone number, POPID, POP password, E-mail address, POP server, SMTP mail server, and news server.

If necessary, the user of the camcorder 11 writes down the details shown in FIG. 12. Subsequently, the user operates the input unit 77 to output a confirmation signal to the Internet service provider A 17.

In step S80, the customer database 52 of the Internet service provider A 17 sends camcorder setting information.

When the camcorder 11 receives the camcorder setting information, in step S59 of FIG. 10, the camcorder 11 displays the camcorder setting information on the LCD 78.

FIG. 13 shows an example of the camcorder setting information sent from the customer database 52 to the camcorder 11, as discussed above. In this example, the camcorder setting information is formed of a DI customer ID, DI password, and access point phone number.

The access point phone number represents a phone number of a point to be accessed when the camcorder 11 connects to the Internet 10, that is, the access point 51 of the Internet service provider A 17.

In step S60, the user of the camcorder 11 operates the input unit 77 and sets the camcorder setting information displayed in such a manner to the camcorder 11 to serve as a condition for connecting to the Internet 10. The setting is stored in the EEPROM 74.

For example, in order that a user who has purchased a personal computer connects to the Internet 10 via a general service provider (the Internet service provider B 18 in the example of FIG. 2), as shown in FIG. 14A, the user is required to set twelve items, namely, PPP connection ID, PPP connection password, access point phone number, Primary DNS Server, Secondary DNS Server, Proxy Server, Port Number, POP authentication ID, POP authentication password, POP Server, SMTP Server, and mail address. In contrast, by performing the ISP-A easy registration processing, the user who has purchased the camcorder 11 is only required to set three items, as shown in FIG. 14B, namely, Unified ID (corresponding to the DI customer ID in FIG. 13), password (corresponding to the DI password in FIG. 13), and access point phone number (corresponding to the access point phone number in FIG. 13). Even a user unfamiliar with the setting operation can easily perform operations for establishing a connection with the Internet.

When the user of the camcorder 11 is already a member of the Internet service provider A 17, the user operates the input unit 77 in response to the request from the customer database 52 and inputs the user ID for the Internet service provider A 17. In this case, when the CPU 71 of the camcorder 11 obtains the user ID for the Internet service provider A 17, which is input from the user, the CPU 71 causes in step S61 of FIG. 10 the communication unit 82 to send the user ID for the Internet service provider A 17 to the customer database 52.

In step S81 of FIG. 11, the CPU 191 of the customer database 52 of the Internet service provider A 17 receives and obtains the user ID for the Internet service provider A 17, which is sent from the camcorder 11. In step S82, the CPU 191 sends to the camcorder 11 the camcorder setting information for associating the user's ID for the Internet service provider A 17 with the temporary ID and the temporary password included in the user's personal information received by the processing in step S71.

In step S62, the CPU 71 of the camcorder 11 receives the camcorder setting information for associating the ID for the Internet service provider A 17 with the temporary ID and the temporary password, which is sent from the customer database 52. In step S63, the CPU 71 performs the processing to set the ID for the Internet service provider A 17 to be associated with the temporary ID and the temporary password on the basis of the input performed by operating, by the user, the input unit 77. Specifically, the CPU 71 generates an association table for associating the ID for the Internet service provider A 17 with the temporary ID and the temporary password. Subsequently, when the temporary password and the temporary ID are input and a command to connect to the Internet 10 is given, the CPU 71 translates the temporary ID and the temporary password into the ID for the Internet service provider A 17 and performs the access processing to access the Internet service provider A 17.

Subsequent to the processing in steps S80 and S82 of FIG. 11, the CPU 191 of the customer database 52 proceeds to step S83 and sends the information registered by the processing up to that time or, when the registered information is updated by the user, the updated information to the network system 14.

When the customer database 32 of the network system 14 receives the registered information from the Internet service provider A 17, the registered information is registered in the customer database 32. Also, the registered information is sent to the camcorder image station 41 of the network service business center 15 to be reflected therein.

Figure 15:
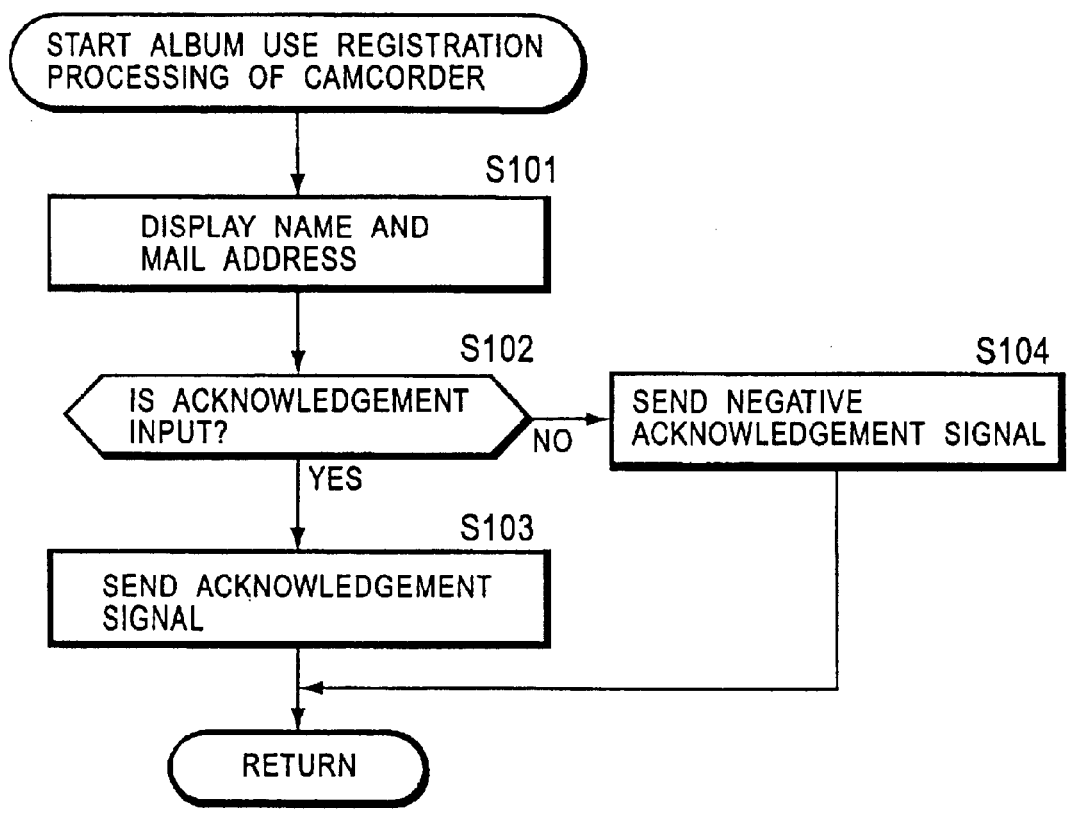
FIG. 15 is a flowchart for describing the album use registration processing by the camcorder of FIG. 2.

Subsequent to the above-described ISP-A easy registration processing, the album use registration processing is performed. With reference to flowcharts of FIGS. 15 and 16, the album use registration processing is described. FIG. 15 shows the album use registration processing by the camcorder 11, and FIG. 16 shows the corresponding album use registration processing by the camcorder image station 41.

When the ISP-A easy registration processing is completed, the CPU 191 of the customer database 52 of the Internet service provider A 17 transfers the right to manage the processing for the camcorder 11 to the camcorder image station 41 of the network service business center 15.

Figure 16:
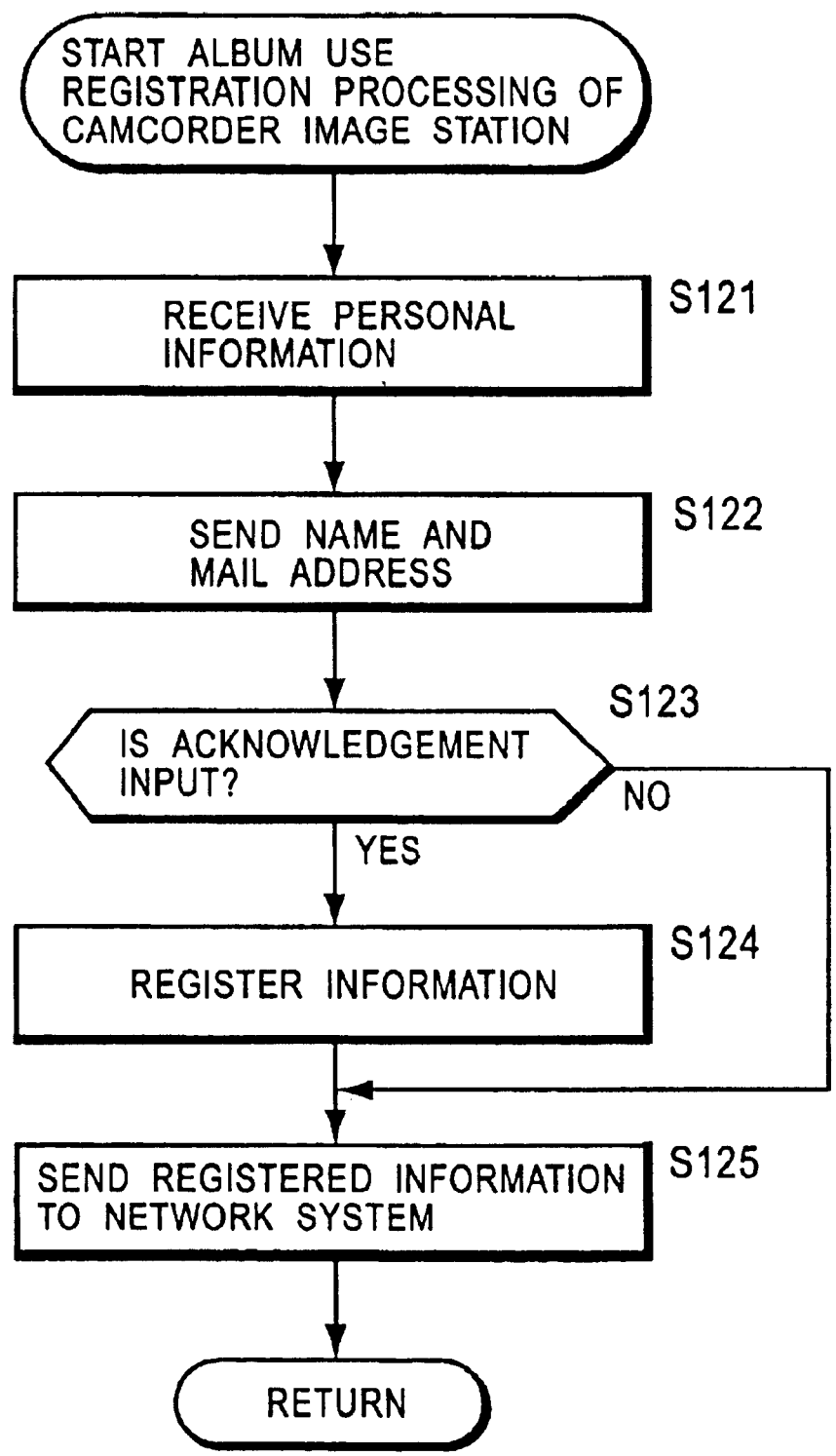
FIG. 16 is a flowchart for describing the album registration use processing by the camcorder image station of FIG. 2.

When he CPU 151 of the camcorder image station 41 receives in step S121 of FIG. 16 the personal information on the camcorder 11, which is sent from the customer database 32 of the network system 14 in step 534 of FIG. 9, via the communication unit 159, the CPU 151 supplies the personal information to the storage unit 158 and stores the personal information in the storage unit 158. In step S122, the CPU 151 reads a name and mail address from the received personal information and sends the name and mail address to the camcorder 11.

When the CPU 71 of the camcorder 11 receives the name and mail address from the camcorder image station 41, in step S101, the CPU 71 outputs the name and mail address to the LCD 78 and displays the name and mail address on the LCD 78. The user of the camcorder 11 views the displayed name and mail address and determines whether or not they are correct. The mail address (E-mail address) has been set by the member registration with the Internet service provider A 17 (FIG. 12).

When the user of the camcorder 11 determines that the name and mail address are correct, the user operates the input 77 and, when acknowledging the name and mail address to be used in album use registration, inputs an acknowledgement. In step S102, the CPU 71 determines whether or not an acknowledgement is input. When an acknowledgement is input, in step S103, the CPU 71 sends an acknowledgement signal corresponding to the input to the camcorder image station 41.

In contrast, when the user does not acknowledge the album use registration, the user operates the input unit 77 and inputs a negative acknowledgement. In step S104, the CPU 71 sends a negative acknowledgement signal indicating that the album use registration is not acknowledged to the camcorder image station 41.

In step S123 of FIG. 16, the CPU 151 of the camcorder image station 41 determines whether or not an acknowledgement signal is input. When an acknowledgement signal is input, in step S124, the CPU 151 stores the personal information received in step S121 in the storage unit 158.

In contrast, when it is determined in step S123 that no acknowledgement signal is input, the processing in step S124 is skipped.

As discussed above, the personal information corresponding to the temporary ID and the temporary password issued by the network system 14 is registered in the camcorder image station 41.

Subsequently in step S125, when the user inputs a command to update the registered information, the CPU 151 of the camcorder image station 41 sends the command to the network system 14.

The customer database 32 of the network system 14 registers the updated information. Also, the customer database 32 sends the updated information to the customer database 52 of the Internet service provider A 17 and registers the updated information in the customer database 52.

After issuing the temporary ID and the temporary password, the customer database 32 of the network system 14 sends by mail a postcard having printed thereon a real ID and a real password to the user's address. When the user receives the postcard, the user changes the temporary ID and the temporary password to the real ID and the real password and uses them.

When the customer database 32 issues the real ID and the real password, the customer database 32 sends them via the Internet 10 to the network service business center 15 and the Internet service provider A 17. The network service business center 15 and the Internet service provider A 17 each register the real ID and the real password. The temporary ID and the temporary password can be used for a predetermined period (such as two weeks) after being issued. The network system 14, the network service business center 15, and the Internet service provider A 17 recognize the validity of the temporary ID and the temporary password only for two weeks. When the temporary ID and the temporary password are used after the validity period has elapsed, access is denied.

Although the user is registered with the network system 14 using the camcorder 11 in the above description, the user may be registered using a personal computer via the Internet 10 or may be registered using a postcard.

With reference to a flowchart of FIG. 17, the processing by the camcorder 11 connecting to the network system 14, the network service business center 15, or the Internet service provider A 17 will now be described. The user operates the input unit 77 and inputs the temporary ID and the temporary password (or the real ID and the real password which are subsequently set) assigned when the user is registered with the network system 14. In step S141, the CPU 71 obtains the ID and password which are input on the basis of operating, by the user, the input unit 77. In step S142, the CPU 71 determines whether or not an access destination designated by the user is the Internet service provider A 17.

When the access destination is the Internet service provider A 17, in step S134, the CPU 71 determines whether or not the translation table generated in step S63 exists. When the translation table exists (when the user of the camcorder 11 has already been a member of the Internet service provider A 17 and had a user ID before the user registers himself/herself for the camcorder 11), in step S144, the CPU 71 translates the ID and password obtained in step S141 into an ID for the Internet service provider A 17 on the basis of the translation table. In step S145, the CPU 71 controls the communication unit 82 on the basis of the ID for the Internet service provider A 17 and causes the communication unit 82 to access the Internet service provider A 17.

When it is determined in step S143 that there is no translation table (after the user has purchased the camcorder 11 and registered himself/herself with the network system 14, the user registers for a membership with the Internet service provider A 17), in step S145, the CPU 71 uses the input ID and password to access the Internet service provider A 17. In this case, as described above, the customer database 52 of the Internet service provider A 17 has the translation table. The Internet service provider A 17 determines on the basis of the translation table whether or not the camcorder 11 is used by an authorized user.

When it is determined in step S142 that the access destination is not the Internet service provider A 17, in step S146, the CPU 71 determines whether or not the access destination is the network system 14. When the access destination is the network system 14, in step S147, the CPU 71 accesses the network system 14 on the basis of the ID and password obtained in step S141. Similarly, when it is determined in step S146 that the access destination is not the network system (when it is determined that the access destination is the network service business center 15), in step S148, the CPU 71 accesses the network service business center 15 using the ID and password obtained in step S141.

Figure 18:
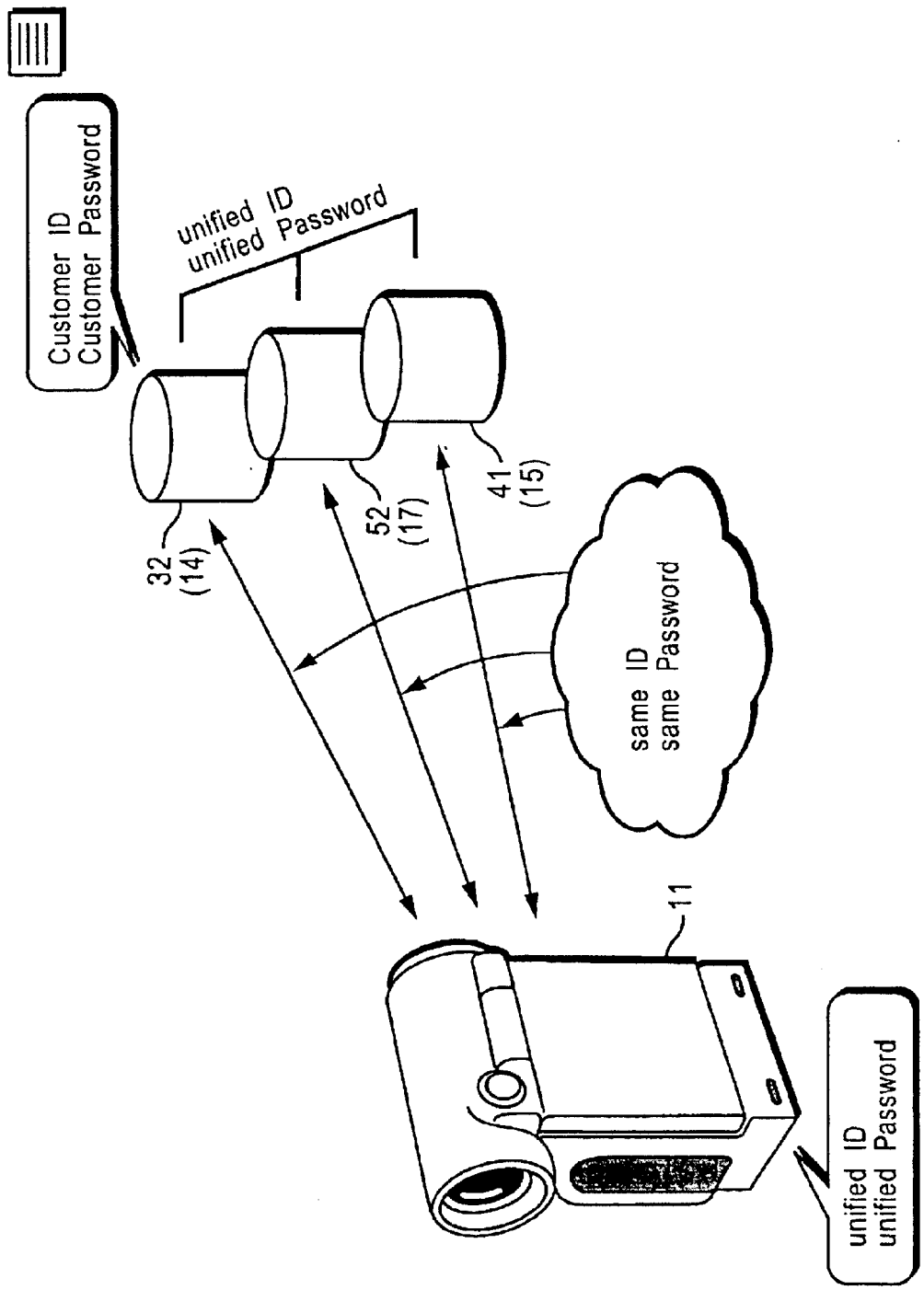
FIG. 18 is an illustration for describing the use of a common ID and password.

As described above, in the service providing system, as shown in FIG. 18, the services of the network system 14, the network service business center 15, and the Internet service provider A 17 are received using the temporary ID and the temporary password (the same ID and password), which are issued when the user registers himself/herself with the network system 14, as the corresponding ID and password for each of the network system 14, the network service business center 15, and the Internet service provider A 17.

In other words, with the above-described processing, the user uses the camcorder 11 to connect to the network system 14, the network service business center 15, and the Internet service provider A 17 and performs the processing such as sending/receiving email, browsing web pages, and using an album.

Figure 19:
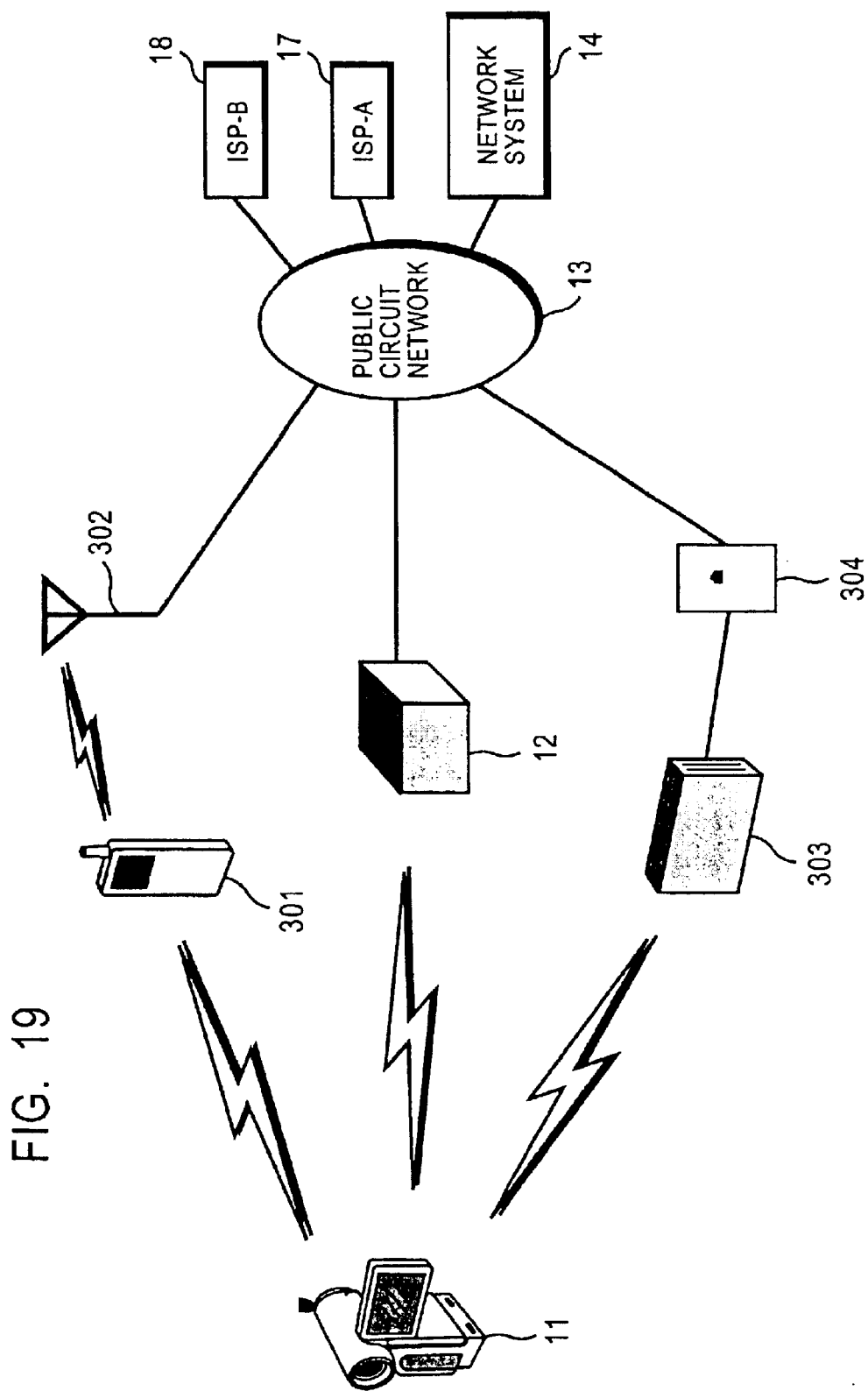
FIG. 19 is an illustration for describing connections using Bluetooth devices.

As described using FIG. 2, the camcorder 11 connects to the Bluetooth adapter 12 using short-range wireless communication based on Bluetooth (trademark) and, from the Bluetooth adapter 12, connects to the network system 14, the Internet service provider A 17, or the Internet service provider B 18 via the public circuit network 13. Also, as shown in FIG. 19, the camcorder 11 connects to the public circuit network 13 via, instead of the Bluetooth adapter 12, a Bluetooth-enabled cellular phone 301 and a base station 302 or a Bluetooth modem 303 and a modular jack 304, connects to the network system 14, the Internet service provider A 17, or the Internet service provider B 18, and connects to the Internet 10.

Figure 20:
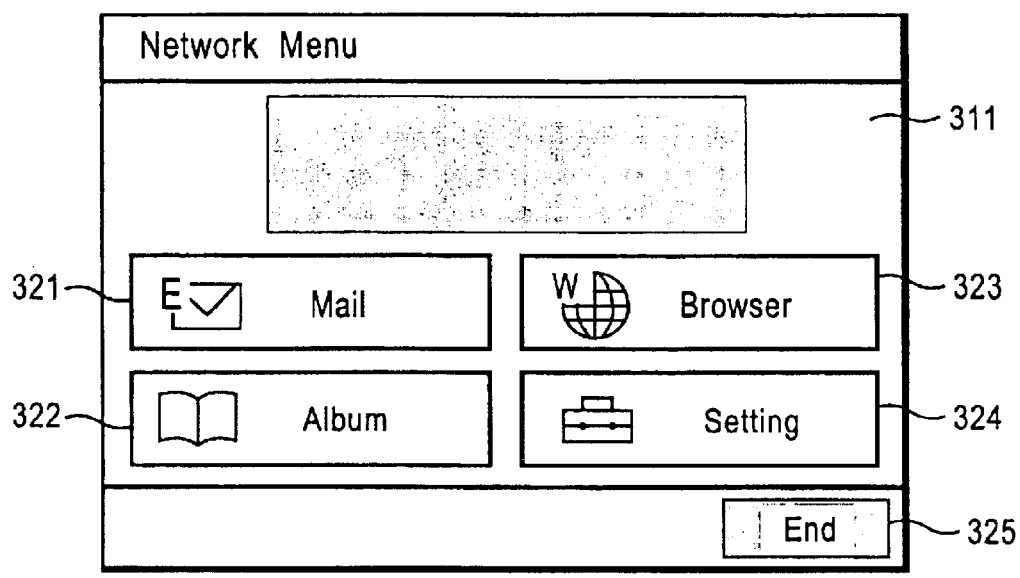
FIG. 20 is an illustration for describing a network menu window.

In response to operating, by the user, a predetermined key of the input unit 77, the LCD 78 of the camcorder 11 displays a network menu window 311 shown in FIG. 20. The network menu window 311 is provided with a mail button 321 for proceeding to an operation window for sending and receiving mail; an album button 322 for proceeding to an operation window for uploading captured image data to the camcorder image station 41 of the network service business center 15, editing the uploaded image data, or browsing the image data; a browser button 323 for proceeding to an operation window for browsing a web page, a setting button 324 for proceeding to an operation window for performing various settings, and an end button 325 selected when terminating the network menu.

Figure 21:
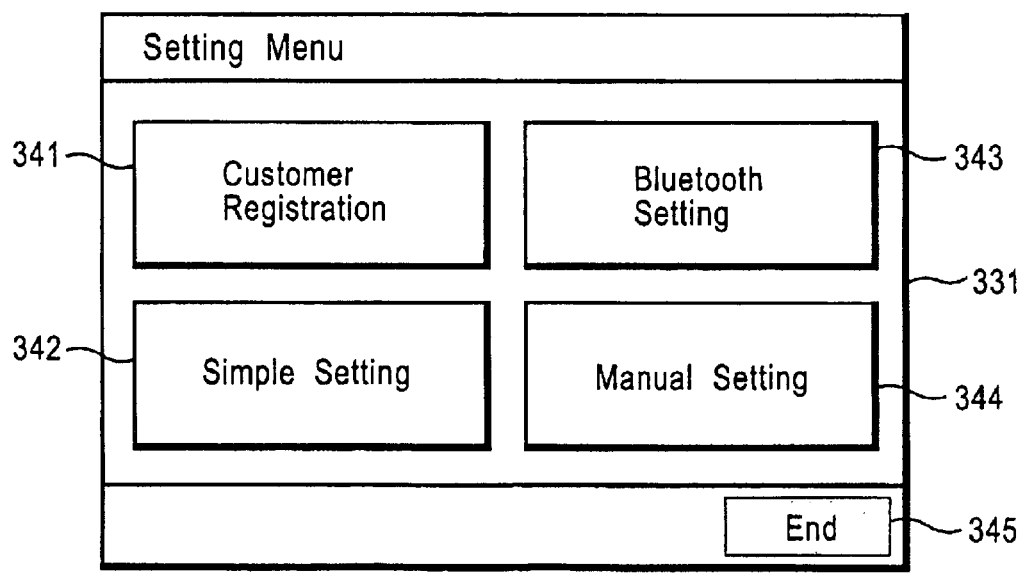
FIG. 21 is an illustration for describing a setting menu window.

When the user selects the setting button 324, the LCD 78 displays a setting menu window 331 shown in FIG. 21. The setting menu window 331 is provided with a customer registration button 341 for proceeding to an operation window for performing the above-described customer registration, an easy setting button 342 for proceeding to an operation window for performing the easy setting, a Bluetooth setting button 343 for proceeding to an operation window for performing the Bluetooth-related setting, a manual setting button 344 for proceeding to an operation window for performing various other manual settings, and an end button 345 selected when closing the setting menu window 331 and displaying the network menu window 311 described using FIG. 20.

With reference to a flowchart of FIG. 22, the setting processing for Bluetooth connection will now be described.

In step S201, the CPU 71 determines whether or not the Bluetooth setting button 343, which is described using FIG. 21, has been selected on the basis of a signal indicating a user operation input from the input unit 77 via the input/output interface 76 and the bus 75. When it is determined in step S201 that the Bluetooth setting button 343 is not selected, the processing in step S201 is repeated until it is determined that the Bluetooth setting button 343 is selected.

Figure 23:
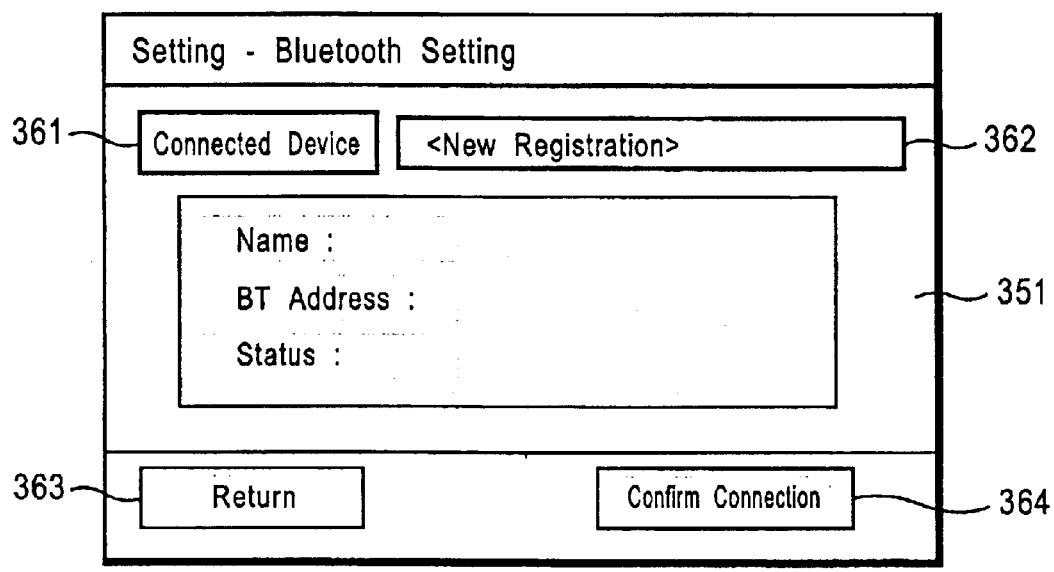
FIG. 23 is an illustration for describing a Bluetooth setting window.

When the Bluetooth setting button 343 is selected in the setting menu window 331 described using FIG. 21, a Bluetooth setting window 351 shown in FIG. 23 is displayed., The Bluetooth setting window 351 is provided with a connected device button 361 selected to set a connected device, a list box 362 displaying information on the setting of a connected device, a return button 363 selected to terminate the Bluetooth setting and return to the setting menu window 331 described using FIG. 21, and a confirm button 364 selected to perform the connection processing and to confirm whether or not the Bluetooth setting is correct.

Figure 24:
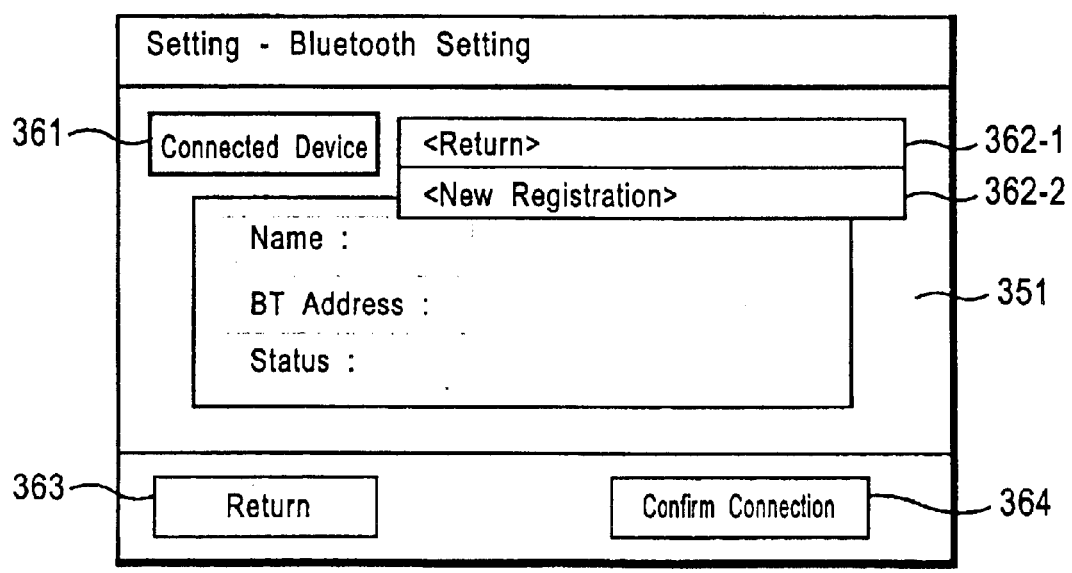
FIG. 24 is an illustration for describing a method of displaying a list box of FIG. 23.

When the connected device button 361 is selected, as shown in FIG. 24, the list box 362 displays a plurality of list boxes. Since a case in which a new Bluetooth device is registered will now be described, a list box 362-1 displaying <return> and a list box 362-2 displaying <new registration> are displayed. When a Bluetooth device is already registered, the name of the registered Bluetooth device is displayed in the list box 362.

When it is determined in step S201 that the Bluetooth setting button 343 is selected, the Bluetooth setting window 351 of FIG. 23 is displayed. In step S202, the CPU 71 determines whether or not the connected device button 361 is selected to perform new registration of a connected device and, of the displayed list boxes 362, the list box 362-2 labeled <new registration> is selected. When it is determined in step S202 that new registration of a connected device is not selected, the processing in step S202 is repeated until it is determined that new registration of a connected device is selected.

Figure 25:
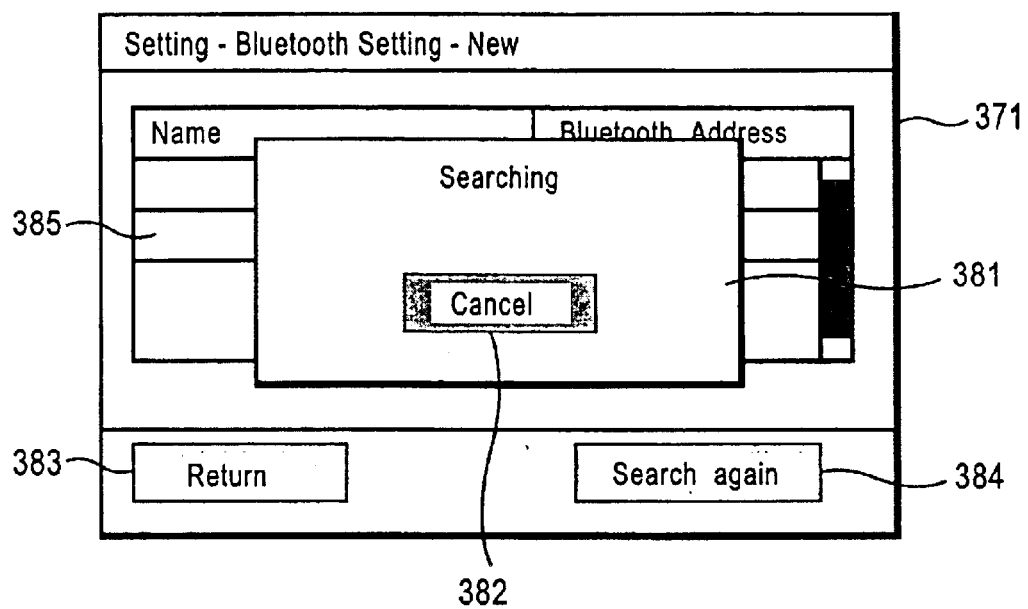
FIG. 25 is an illustration for describing a new registration window.

When it is determined in step S202 that new registration of a connected device is selected, in step S203, the CPU 71 performs the automatic Bluetooth device detection processing and displays a new registration window 371 shown in FIG. 25.

During the search processing, a searching dialog box 381 is displayed in front of the new registration window 371 shown in FIG. 25. The searching dialog box 381 includes a cancel button 382. When the user wants to cancel the search processing before the search is complete, the user operates the cancel button 382. The new registration window 371 is also provided with a return button 383 operated to return to the Bluetooth setting window 351, a search again button 284 selected to conduct the search again, and a search result display area 385 for displaying a search result.

Figure 26:
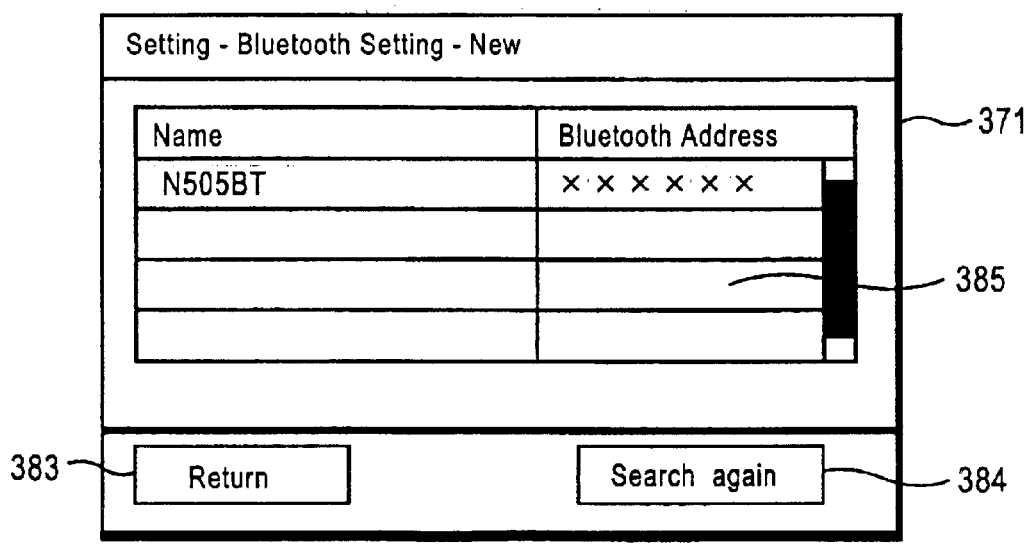
FIG. 26 is an illustration for describing a displayed search result.

When the search processing is completed and a Bluetooth device is detected, as shown in FIG. 26, the searching dialog box 381 is immediately stopped being displayed. The name and Bluetooth address of the detected Bluetooth device are displayed in the search result display area 385. When a plurality of names and Bluetooth addresses of detected Bluetooth devices is displayed in the search result display area 385, the user presses, for example, a cursor key of the input unit 77 and changes a selected name and Bluetooth address (hatched portion in the drawing) of the names and Bluetooth addresses displayed in the search result display area 385. Accordingly, a desired device can be designated and selected from among the plurality of Bluetooth devices.

In step S204, the CPU 71 determines whether or not any one of the detected Bluetooth devices displayed in the search result display area 385 is selected. When it is determined in step S204 that none of the devices is selected, the processing in step S204 is repeated until any one of the devices is selected.

Figure 27:
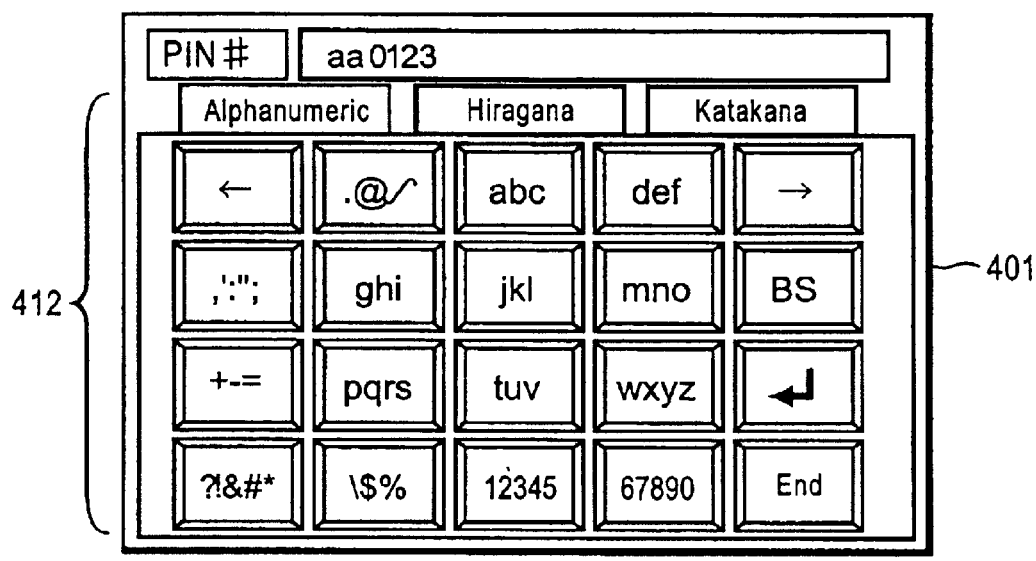
FIG. 27 is an illustration for describing a PIN input window.

When it is determined in step S204 that any one of the Bluetooth devices displayed in the search result display area 385 is selected, in step S205, the CPU 71 displays a PIN (Personal Identification Number) input window 401 displayed in FIG. 27 and receives a PIN input from the user.

The PIN input window 401 is provided with a text box 411 for displaying an input PIN and buttons 412 for inputting a PIN. The user uses the input unit 77 to operate the buttons 412 and inputs a PIN. When the user refers to the text box 411 and determines that a correct PIN is input, the user selects an end button of the buttons 412.

Figure 28:
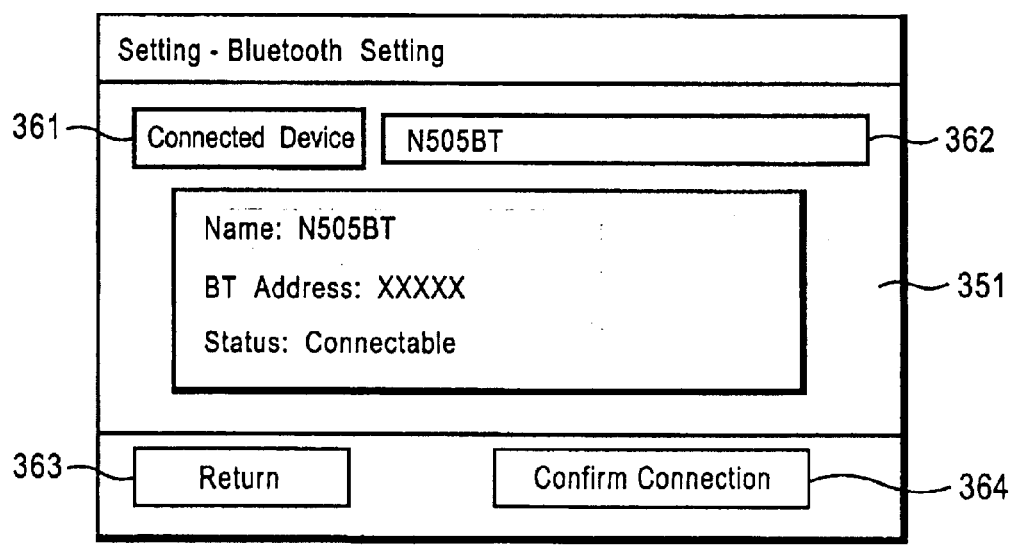
FIG. 28 is an illustration for describing a displayed window for confirming the setting details.

In step S206, the CPU 71 displays, for example, as shown in FIG. 28, the setting details in the Bluetooth setting window 351. The CPU 71 generates data corresponding to a setting confirmation window, outputs the data to the LCD 78 via the bus 75 and the input/output interface 76, and displays the data on the LCD 78. The processing is completed.

With the above-described processing, the camcorder 11 connects to the public circuit network 13 via the set Bluetooth device.

Figure 17:
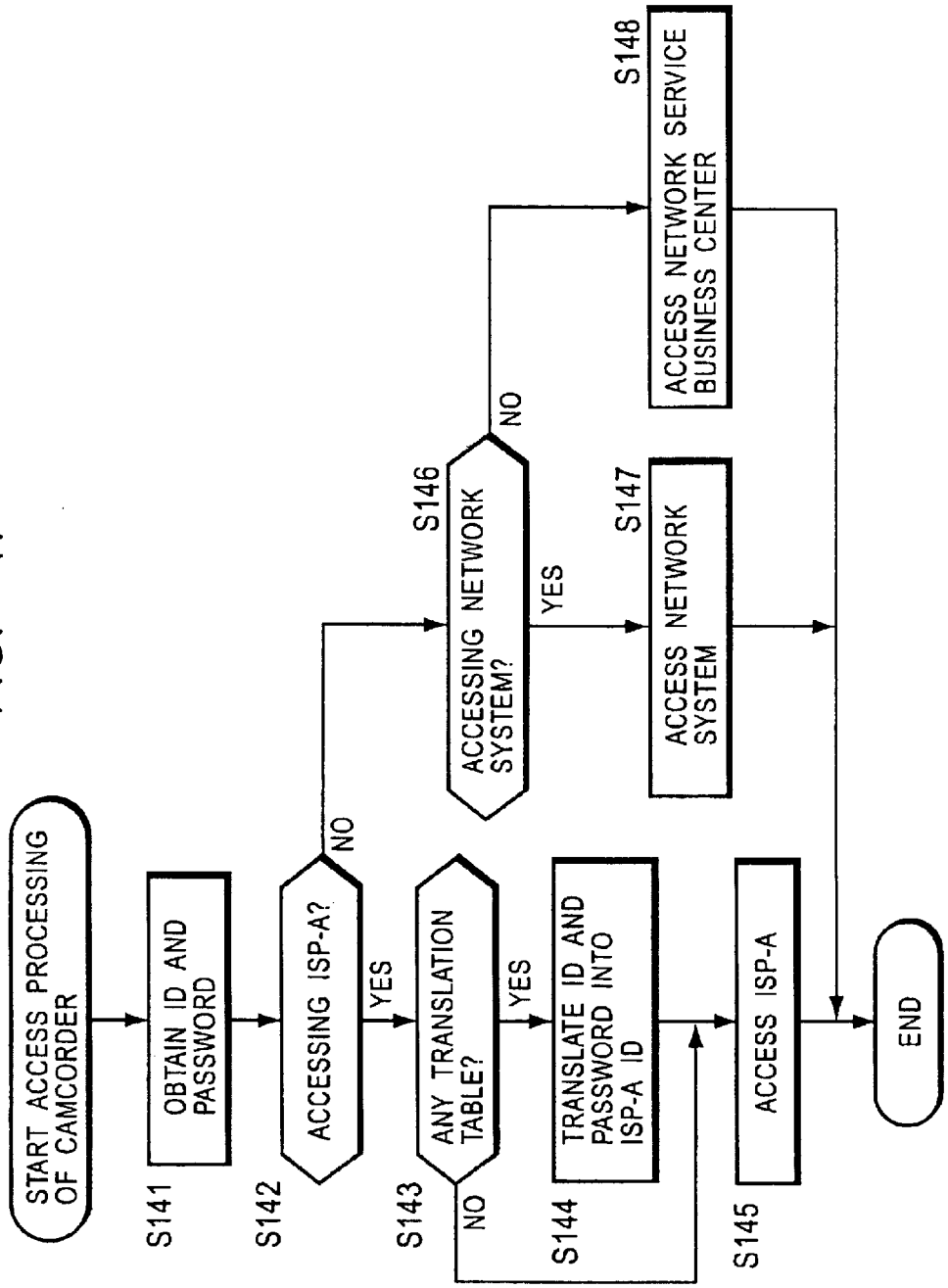
FIG. 17 is a flowchart for describing the access processing by the camcorder of FIG. 2.

For example, the Bluetooth-based connection processing is also performed in step S11 of the digital image customer registration processing by the camcorder 11, which is described using FIG. 8, or in step S145, step S147, or step S148 of the access processing by the camcorder 11, which is described using FIG. 17.

Figure 29:
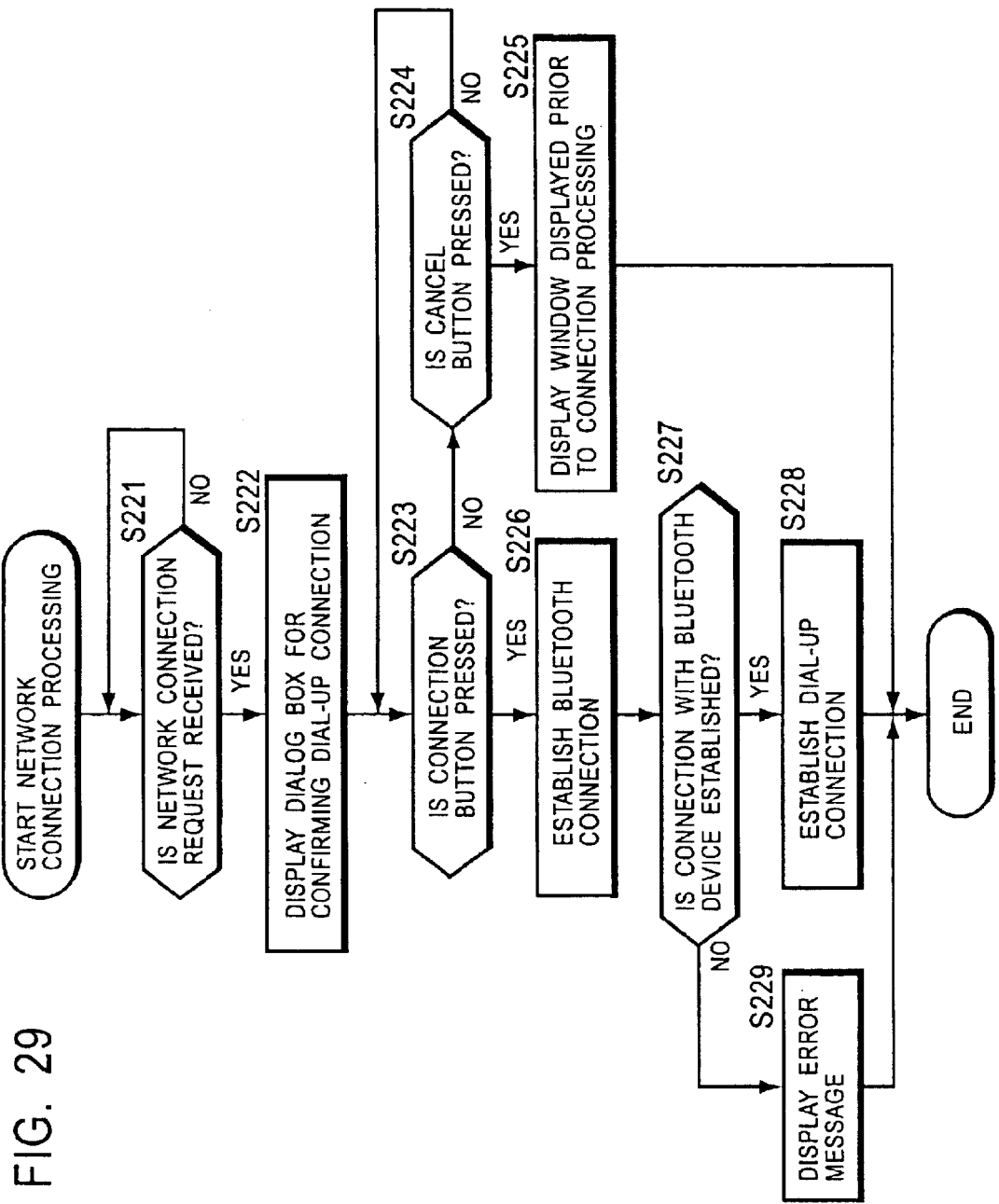
FIG. 29 is a flowchart for describing the network connection processing.

With reference to a flowchart of FIG. 29, the network connection processing will now be described.

In step S221, the CPU 71 determines whether or not a network connection request is received on the basis of a signal indicating a user operation, which is input from the input unit 77 via the input/output interface 76 and the bus 75.

Figure 30:
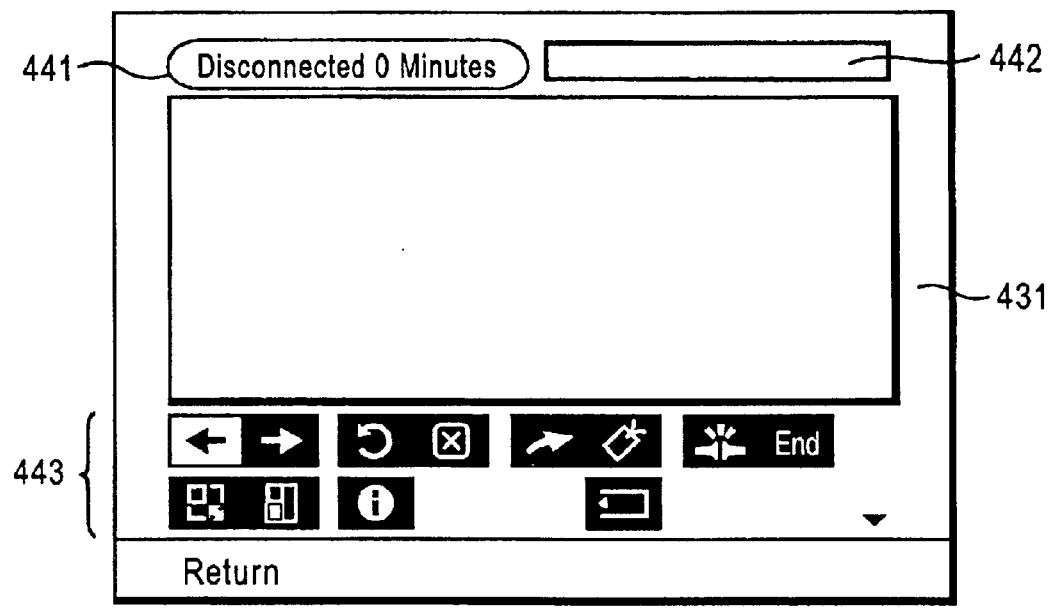
FIG. 30 is an illustration for describing a browser window.

The network connection request is made when the processing in step S11 of the digital image customer registration processing by the camcorder 11, which is described using FIG. 8, or the processing in step S145, step S147, or step S148 of the access processing by the camcorder 11, which is described using FIG. 17, is performed. In addition to these cases, a network connection request is made in a case in which, for example, the browser button 323 is selected in the network menu window 311 described using FIG. 20, a browser window 431 shown in FIG. 30 is displayed, and a predetermined operation is performed. When such processing is performed, an ID and password are input if necessary.

The browser window 431 shown in FIG. 30 is provided with a connection status display section 441 that displays the current connection status of the camcorder 11 with a network such as the Internet 10; a text box 442 for inputting a URL (Uniform Resource Locator) of a web page the camcorder 11 wants to connect to or a URL of a web page the camcorder 11 is currently connecting to; and a tool bar 443 selected by the user when inputting various commands. The tool bar 443 includes a plurality of buttons for issuing a page switching command, a page re-reading command, and the like. The user can set whether or not to display the tool bar 443.

For example, when the connection status display section 441 displays that the camcorder 11 is disconnected and a URL is input in the text box 442 and confirmed, the CPU 71 recognizes the operation as a network connection request and performs the processing to access a web page represented by the URL input in the text box 442.

Figure 31:
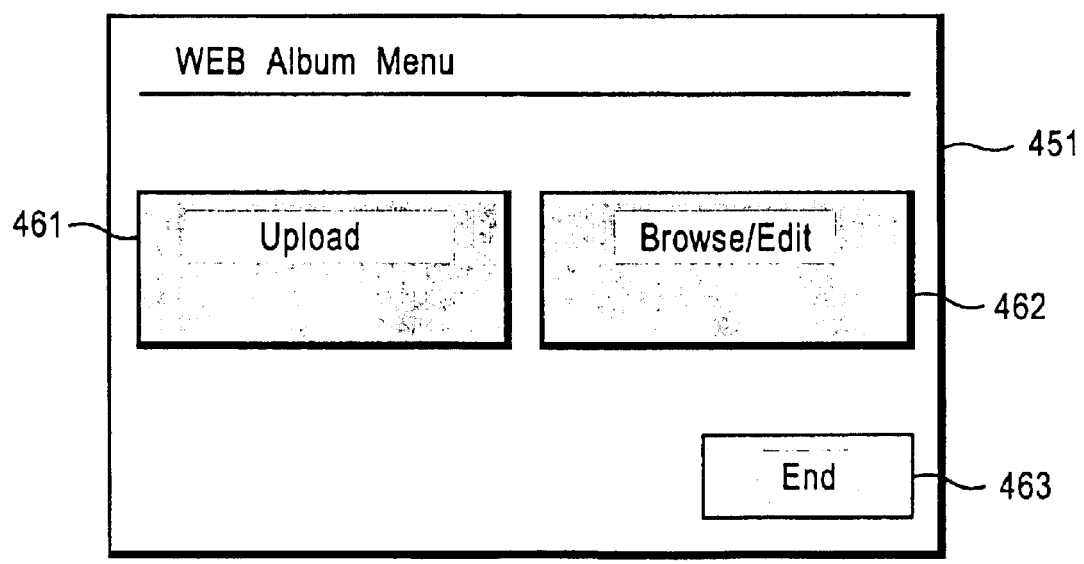
FIG. 31 is an illustration for describing an album menu window.
Figure 32:
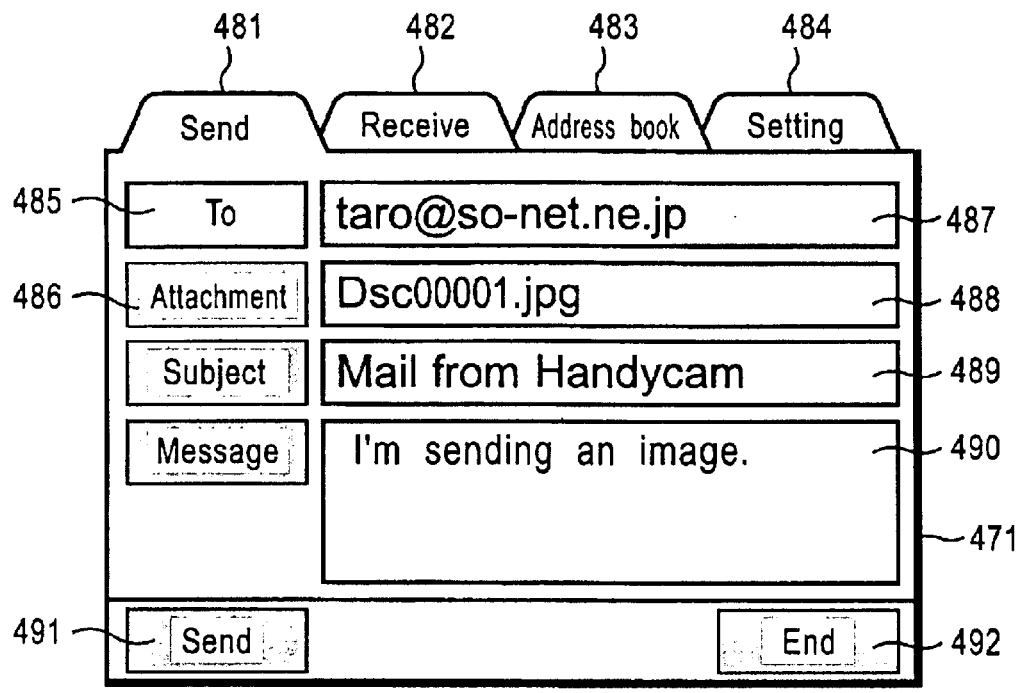
FIG. 32 is an illustration for describing a mail window.

A network connection request is also made in a case in which the album button 322 is selected in the network menu window 311 described using FIG. 20, an album menu window 451 shown in FIG. 31 is displayed, and a predetermined operation is performed, or in a case in which the mail button 321 is selected in the network menu window 311 described using FIG. 20, a mail window 471 shown in FIG. 32 is displayed, and a predetermined operation is performed.

The album menu window 451 shown in FIG. 31 is provided with an upload button 461, a browse/edit button 462, and an end button 463. The upload button 461 is selected to perform the processing for uploading data recorded in the RAM 73, the memory card 85, or the magnetic disk 91, the optical disk 92, the magneto-optical disk 93, or the semiconductor memory 94, which is placed on the drive 87, into the camcorder image station 41 of the network service business center 15.

The browse/edit button 462 is selected to perform the processing for browsing or editing data stored in the camcorder image station 41 of the network service business center 15. The end button 463 is selected to cancel the displaying of the album menu window 451 and return to the displaying of the network menu window 311.

The mail window 471 shown in FIG. 32 is provided with a send tab 481 selected to create mail to be sent, a receive tab 482 selected to receive mail, an address book tab 483 displayed when displaying and editing an address book, and a setting tab 484 selected to perform various settings related to sending and receiving of mail.

The mail window 471 in which the send tab 481 is selected is provided with various operation buttons such as a destination button 485 pressed to input a destination, an attachment button 486 pressed to select a file to be attached, a send button 491 pressed to send created mail, and an end button 492 pressed to cancel the displaying of the mail window 471 and to return to the displaying of the network menu window 311. The mail window 471 is also provided with a text box 487 for inputting a mail address, a text box 488 for inputting the name of a file to be attached, a text box 489 for inputting the subject of mail, and a text box 490 for inputting a mail message.

When it is determined in step S221 that the above-described network connection request is not received, the processing in step S221 is repeated until it is determined that the network connection request is received.

Figure 34:
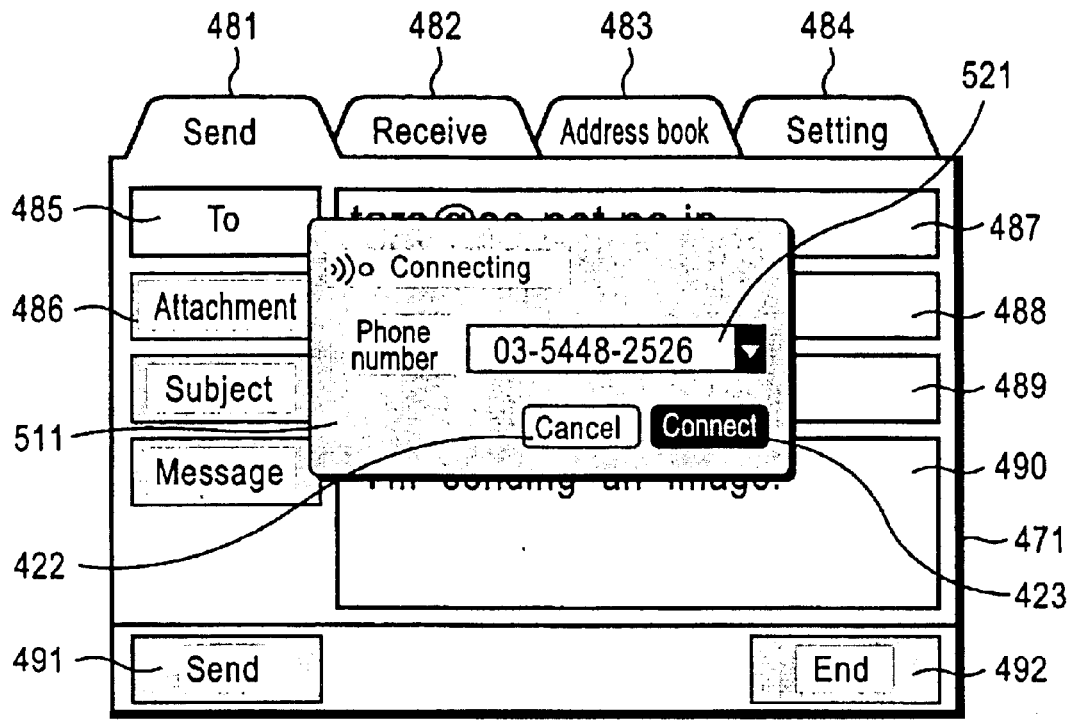
FIG. 34 is an illustration for describing a dialog box displayed to confirm a dial-up connection.

When it is determined in step S221 that the network connection request is received, in step S222, the CPU 71 outputs data corresponding to a dialog box 511 shown in FIG. 34 to the LCD 78 via the bus 75 and the input/output interface 76 and displays the dialog box 511 on the LCD 78 in order to enable the user to confirm whether or not to establish a dial-up connection with a predetermined phone number for accessing the mail server 53 of the Internet service provider A 17 via the public circuit network 13.

The dialog box 511 is provided with a list box 521 that displays a phone number, a cancel button 422 selected to cancel a dial-up connection, and a connection button 423 selected to establish a dial-up connection. When the user wants to establish a dial-up connection with a number other than a phone number displayed beforehand in the list box 521, the user operates the list box 521 and establishes a dial-up connection with another phone number registered in advance.

In step S223, the CPU 71 determines whether or not the connection button 423 of the dialog box 511 is pressed.

When it is determined in step S223 that the connection button 423 of the dialog box 511 is not pressed, in step S224, the CPU 71 determines whether or not the cancel button 422 of the dialog box 511 is pressed. When it is determined in step S422 that the cancel button 422 is not pressed, the processing returns to step S223 and the processing from step S223 onward is repeated.

When it is determined in step S224 that the cancel button 422 is pressed, in step S225, the CPU 71 displays the mail window 471 in the state shown in FIG. 32, which is the window displayed prior to the connection processing, on the LCD 78, and the processing is completed.

When it is determined in step S223 that the connection button 423 of the dialog box 511 is pressed, in step S226, the CPU 71 performs the processing to establish a Bluetooth connection via the bus 75, the input/output interface 76, and the communication unit 82 and to connect to the Bluetooth adapter 12, the Bluetooth-enabled cellular phone 301, or the Bluetooth modem 303.

The network connection request will now be described in a case in which the mail button 321 is selected in the network menu window 311 described using FIG. 20, the mail window 471 shown in FIG. 32 is displayed, the text boxes 487 to the 490 are filled with necessary information, and the send button 491 is pressed.

Specifically, the CPU 71 changes the status thereof relative to Bluetooth connection from a "standby status" to an "inquiry status" and receives an IQ packet broadcast via the communication unit 82 by the Bluetooth adapter 12, the Bluetooth-enabled cellular phone 301, or the Bluetooth modem 303, which serves as master. The CPU 71 sends an FHS packet in response to the received IQ packet.

Figure 33:
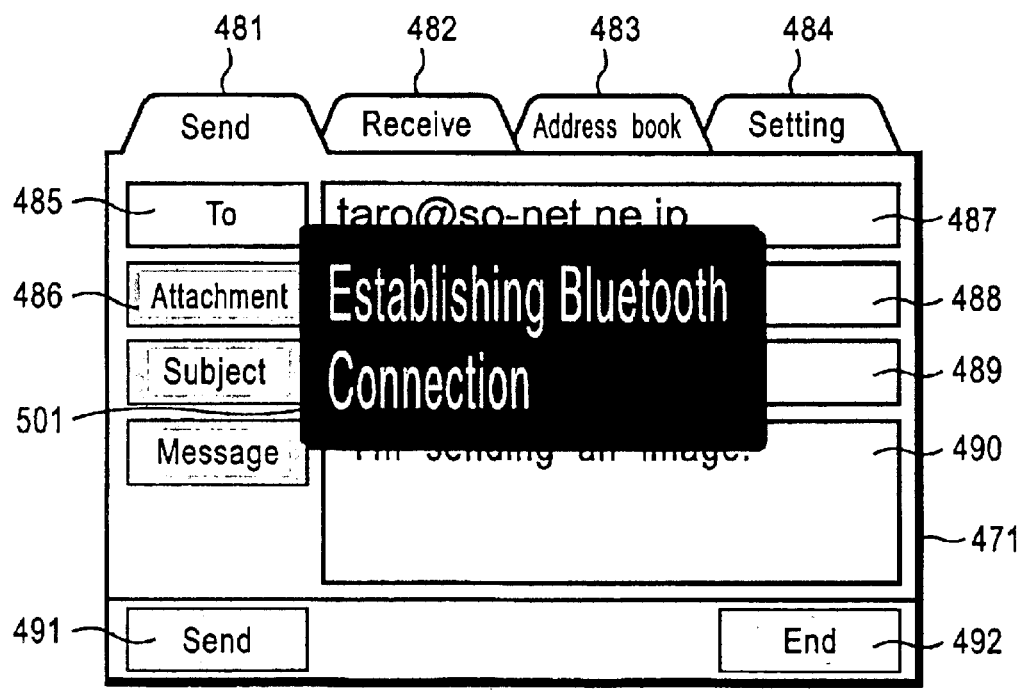
FIG. 33 is an illustration for describing a dialog box displayed while establish a Bluetooth connection.

While the processing in step S226 is performed, as shown in FIG. 33, a dialog box 501 displaying the message "Establishing a Bluetooth connection" is displayed. When the processing in step S226 is completed in a short period of time, the displaying of the dialog box 501 may be omitted.

Figure 22:
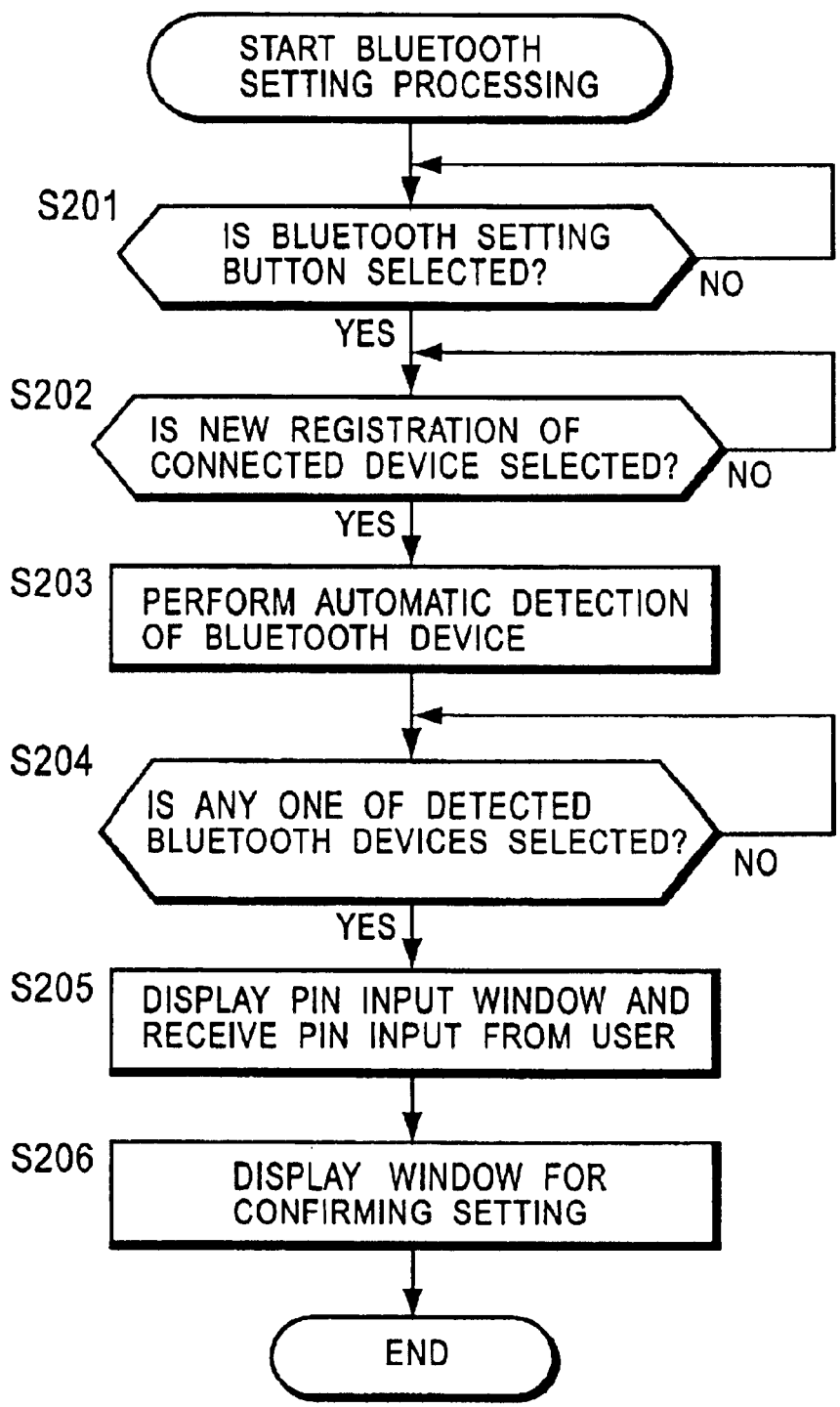
FIG. 22 is a flowchart for describing the Bluetooth setting processing.

When a plurality of Bluetooth devices is set and connectable by the Bluetooth setting processing described using FIG. 22, the user may select in step S226 a Bluetooth device the user wants to connect to from among the plurality of connectably set Bluetooth devices.

The Bluetooth adapter 12, the Bluetooth-enabled cellular phone 301, or the Bluetooth modem 303 that has received the FHS packet changes to a "page status" and sends an ID packet.

In step S227, the CPU 71 determines whether or not a connection is established with the Bluetooth device such as the Bluetooth-enabled cellular phone 301 or the Bluetooth modem 303 on the basis of whether or not the communication unit 82 has received the ID packet.

When it is determined in step S227 that a connection with the Bluetooth device is established, in step S228, the CPU 71 controls the communication unit 82 to establish a dial-up connection via the Bluetooth device and sends created mail to the mail server 53 of the Internet service provider A 17 via the bus 75, the input/output interface 76, the communication unit 82, the Bluetooth adapter 12 (or the Bluetooth-enabled cellular phone 301 or the Bluetooth modem 303), and the public circuit network 13. The processing is completed.

Figure 35:
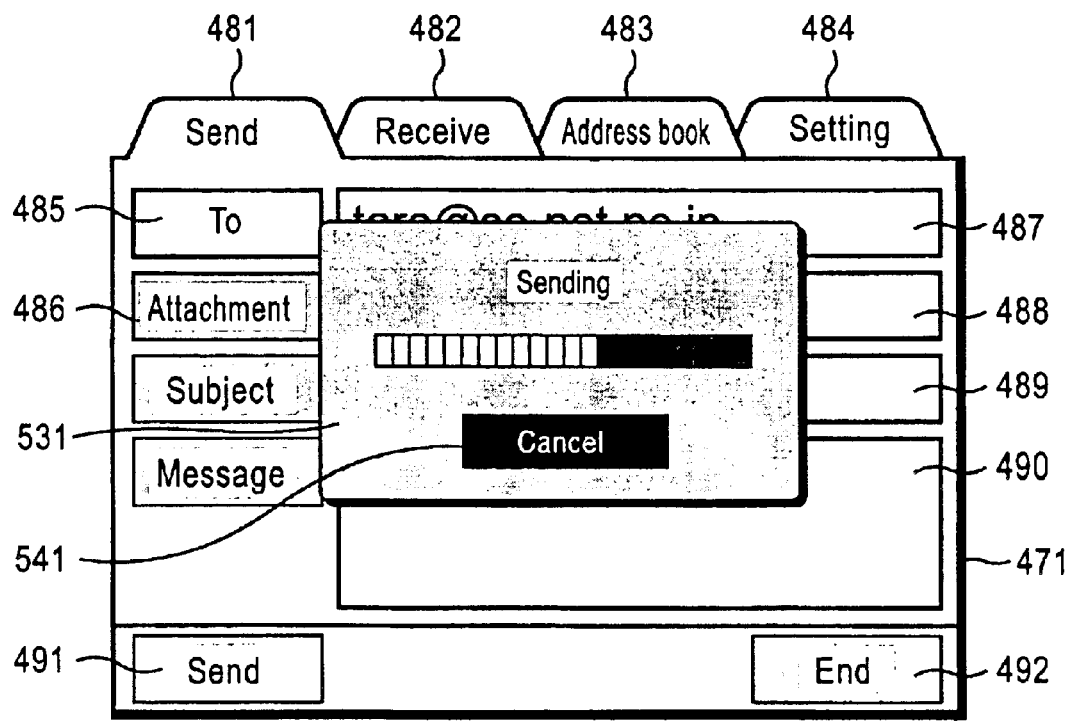
FIG. 35 is an illustration for describing a dialog box displayed while sending mail.

As shown in FIG. 35, a dialog box 531 for informing the user of the fact that mail is being sent is displayed while mail is being sent. The dialog box 531 is provided with a cancel button 541 pressed to cancel the mail sending processing.

When it is determined in step S227 that no connection is established with the Bluetooth device, in step S229, the CPU 71 outputs data corresponding to an error message to the LCD 78 via the bus 75 and the input/output interface 76 and displays the error message on the LCD 78. The processing is completed.

When the network connection request received in step S221 is not a mail sending request, the CPU 71 establishes a Bluetooth connection by the similar processing in order to access a server corresponding to a user operation from among the network system 14, the Internet service provider A 17, and the Internet service provider B 18. Subsequently the CPU 71 establishes a dial-up connection for accessing the corresponding server.

With the above-described processing, a dial-up connection is established. For example, email is sent and/or received, an album is edited, or a desired web page is browsed. Subsequently, the Bluetooth connection is broken at the same time the user breaks the dial-up connection. The camcorder 11 is in a state in which the camcorder 11 is disconnected from a Bluetooth device (standby status) until the subsequent network connection request is made. The power consumption can be reduced without separately establishing a Bluetooth connection and a dial-up connection.

In this description, the camcorder 11 establishes a Bluetooth connection and a dial-up connection in an operatively linked manner. The present invention is not only applicable to the camcorder 11 but also applicable to any device such as a personal computer, a PDA, or a cellular phone capable of connecting to the public circuit network 13 via a Bluetooth connection.

In this description, a case in which a connection with the Internet 10 is established via the public circuit network 13 is described. The present invention is also applicable to a case in which a Bluetooth connection is used to connect to a network other than the Internet 10, such as a LAN (Local Area Network) or a WAN (Wide Area Network), via, for example, Ethernet (registered trademark) or the like.

A series of the above-described processes can be performed by hardware or software. When performing the software-based processing, a program forming the software is installed from a network or a recording medium into a computer included in dedicated hardware or, for example, a general personal computer capable of performing various processes by installing therein various programs.

The recording medium is formed of, as shown in FIGS. 3 to 6, not only package media including the magnetic disks 91 (including a flexible disk), 131, 171, and 211; the optical disks 92 (including a CD-ROM (Compact Disk-Read Only Memory) and a DVD (Digital Versatile Disk)), 132, 172, and 212; the magneto-optical disks 93 (including an MD (Mini-Disk) (registered trademark)), 133, 173, and 213; or the semiconductor memories 94, 134, 174, and 214, but also formed of the ROMs 72, 112, 152, and 192 which are provided to the user in the form of built-in memories in apparatuses and hard disks included in the storage units 118, 158, and 198.

In the description, steps for writing the program recorded in the recording medium are not required to be processed in time series in accordance with the order described. Steps which are performed in parallel with one other or which are performed individually are also included.

The word system in this specification refers to the entirety of an apparatus formed of a plurality of apparatuses.

INDUSTRIAL APPLICABILITY

According to the present invention, when connecting to a network via a connection based on short-range wireless communication such as Bluetooth or via a connection other than the former connection, a connection based on short-range wireless communication is established only when actually connecting to the network. Compared with a case in which a Bluetooth connection is established at all times, the power consumption can be suppressed.

What is claimed is:

1. An information processing apparatus connecting to a network via a connection based on short-range wireless communication, comprising:

input means for receiving input of a user operation;

first connection means for establishing a first connection based on the short-range wireless communication in accordance with the user operation input by the input means;

second connection means for establishing a second connection in synchronization with the establishment of the first connection by the first connection means;

first breaking means for breaking the second connection by the second connection means in accordance with the user operation input by the input means; and second breaking means for breaking the first connection by the first connection means in synchronization with the breaking of the second connection by the first breaking means.

2. The information processing apparatus according to claim 1, wherein the short-range wireless communication is Bluetooth-based communication;

the network is the Internet;

the second connection is a dial-up connection; and the second connection means connects to the Internet via a public circuit network using the dial-up connection.

3. The information processing apparatus according to claim 1, further comprising email sending/receiving means for sending/receiving email, wherein the email sending/receiving means sends/receives the email via the first connection established by the first connection means and the second connection established by the second connection means.

4. The information processing apparatus according to claim 1, further comprising browsing means for browsing a web page, wherein the browsing means accesses a predetermined server in which the web page is stored via the first connection established by the first connection means and the second connection established by the second connection means.

5. The information processing apparatus according to claim 1, further comprising:

image capturing means for capturing an image; and image processing means for performing predetermined image processing of the image captured by the image capturing means.

6. The information processing apparatus according to claim 5, further comprising output means for outputting the image that has undergone the image processing by the image processing means to a predetermined server, wherein the output means outputs the image to the predetermined server via the first connection established by the first connection means and the second connection established by the second connection means.

7. An information processing method for an information processing apparatus connecting to a network via a connection based on short-range wireless communication, comprising:

an input step of receiving input of a user operation;

a first connection step of establishing a first connection based on the short-range wireless communication in accordance with the user operation input by the processing in the input step;

a second connection step of establishing a second connection in synchronization with the establishment of the first connection by the processing in the first connection step;

a first breaking step of breaking the second connection by the processing in the second connection step in accordance with the user operation input by the processing in the input step; and a second breaking step of breaking the first connection by the processing in the first connection step in synchronization with the breaking of the second connection by the processing in the first breaking step.

8. A recording medium having recorded therein a computer-readable program for an information processing apparatus connecting to a network via a connection based on short-range wireless communication, the program comprising:

an input step of receiving input of a user operation;

a first connection step of establishing a first connection based on the short-range wireless communication in accordance with the user operation input by the processing in the input step;

a second connection step of establishing a second connection in synchronization with the establishment of the first connection by the processing in the first connection step;

a first breaking step of breaking the second connection by the processing in the second connection step in accordance with the user operation input by the processing in the input step; and a second breaking step of breaking the first connection by the processing in the first connection step in synchronization with the breaking of the second connection by the processing in the first breaking step.

9. A program executable by a computer controlling an information processing apparatus connecting to a network via a connection based on short-range wireless communication, comprising:

an input step of receiving input of a user operation;

a first connection step of establishing a first connection based on the short-range wireless communication in accordance with the user operation input by the processing in the input step;

a second connection step of establishing a second connection in synchronization with the establishment of the first connection by the processing in the first connection step;

a first breaking step of breaking the second connection by the processing in the second connection step in accordance with the user operation input by the processing in the input step; and a second breaking step of breaking the first connection by the processing in the first connection step in synchronization with the breaking of the second connection by the processing in the first breaking step.

* * * * *